United States Patent
Fujinaka et al.

(10) Patent No.: US 7,352,150 B2
(45) Date of Patent: Apr. 1, 2008

(54) STEPPING MOTOR DRIVING APPARATUS AND STEPPING MOTOR DRIVING METHOD

(75) Inventors: Hiroshi Fujinaka, Osaka (JP); Naoki Kawamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/484,921

(22) Filed: Jul. 10, 2006

(65) Prior Publication Data
US 2007/0046245 A1  Mar. 1, 2007

(30) Foreign Application Priority Data
Jul. 8, 2005 (JP) .............................. 2005-200170

(51) Int. Cl.
*G05B 19/40* (2006.01)
(52) U.S. Cl. ..................... 318/685; 318/599; 318/696; 318/811
(58) Field of Classification Search ................. 318/685
See application file for complete search history.

(56) References Cited

U.S. PATENT DOCUMENTS 6,838,853 B2 * 1/2005 Matsunaga et al. ......... 318/685
7,129,671 B2 * 10/2006 Fukamizu et al. .......... 318/685
2004/0124804 A1  7/2004 Matsunaga et al.

FOREIGN PATENT DOCUMENTS

JP  2004-215385 A  7/2004

\* cited by examiner

*Primary Examiner*—Lincoln Donovan
*Assistant Examiner*—Michael Brandt
(74) *Attorney, Agent, or Firm*—RatnerPrestia

(57) ABSTRACT

A stepping motor driving apparatus includes a detector that detects a current supplied to a winding included in the stepping motor, a first offset adding section that adds an offset to the output of the detector, an amplifier that amplifies the output of the first offset adding section, a reference signal generator that generates a reference signal indicating a current limit, a second offset adding section that adds an offset to the output of the reference signal generator, a switching section that supplies a power to the winding when the switching section is turned on and cuts off a power to the winding when the switching section is turned off, and a PWM controller that turns on the switching section every predetermined period, and turns off the switching section when the output of the amplifier exceeds the output of the second offset adding section.

2 Claims, 22 Drawing Sheets

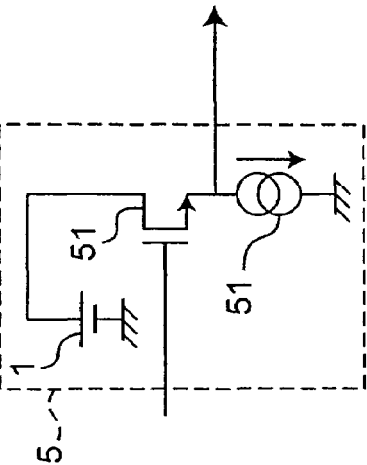
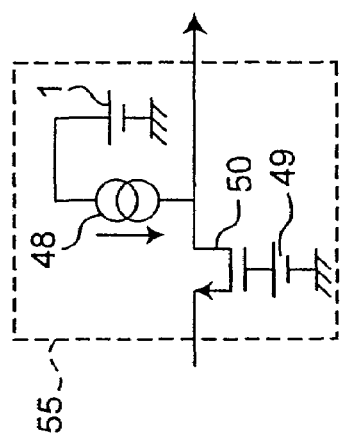
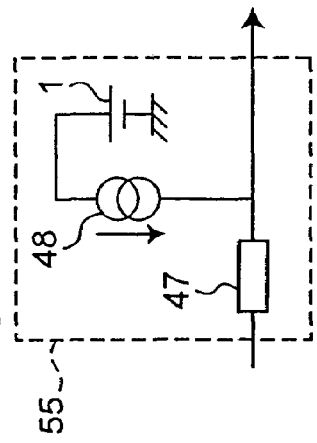
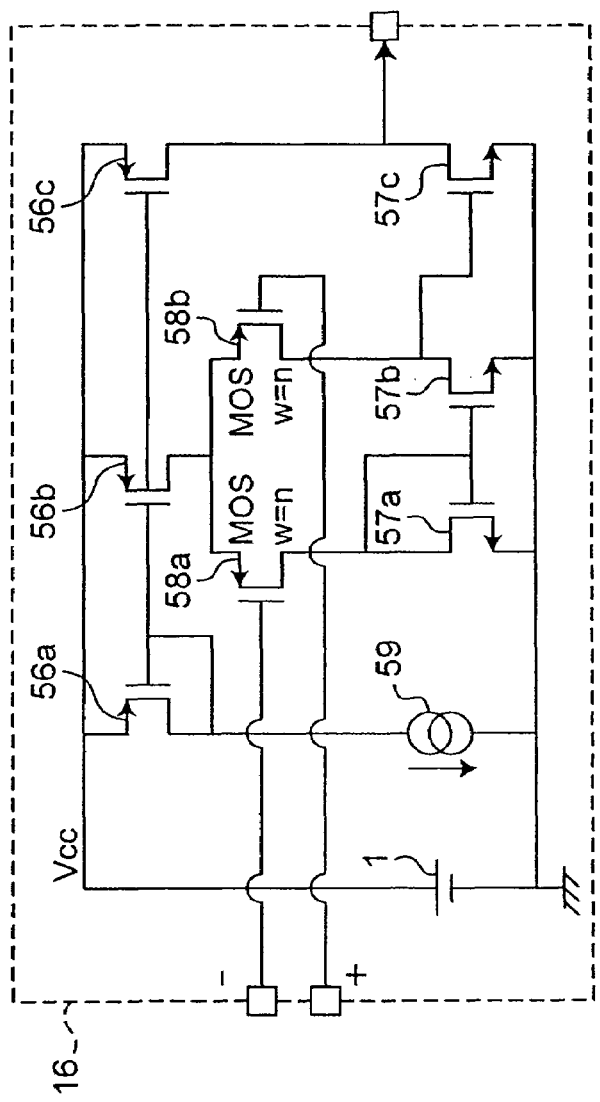

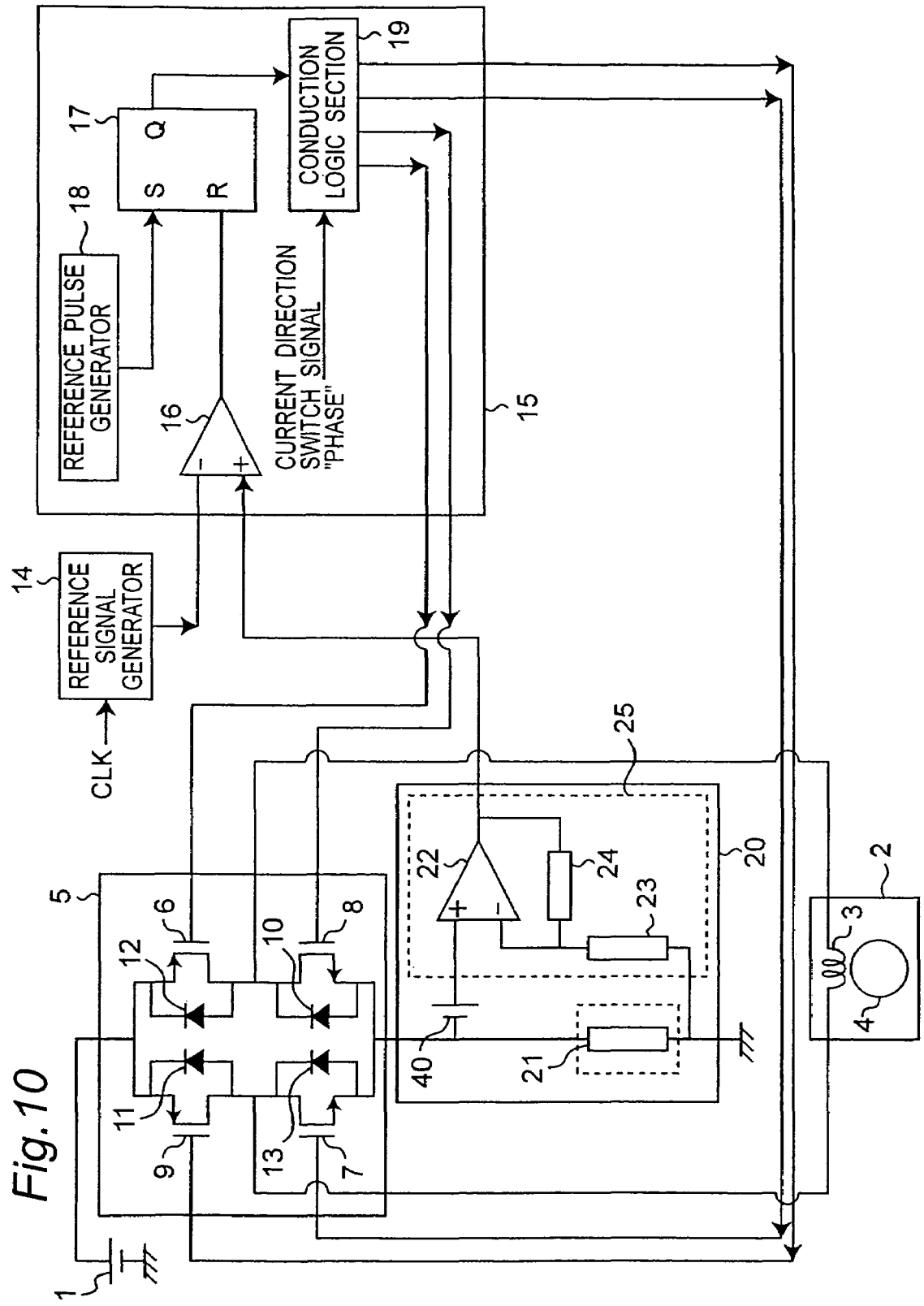

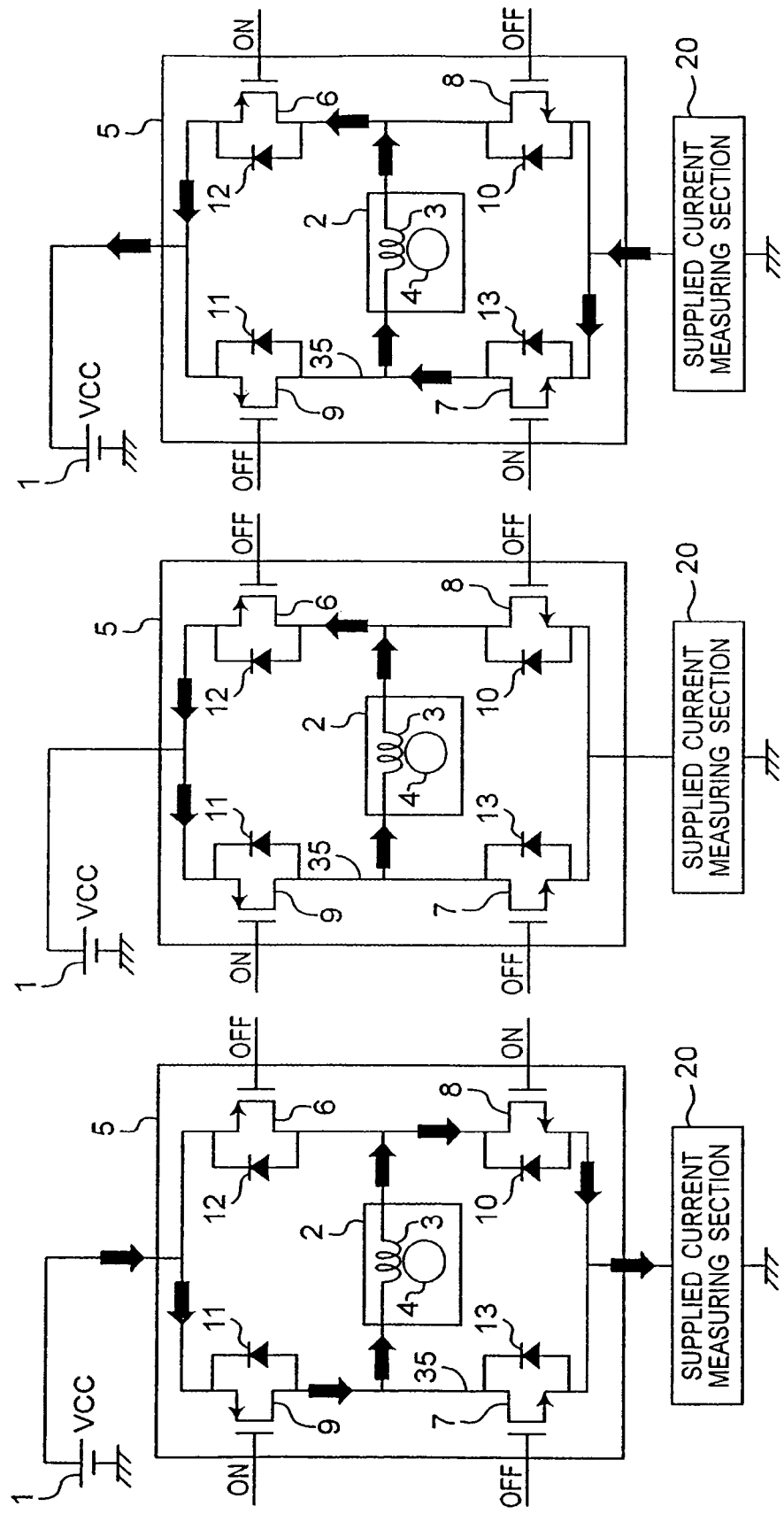

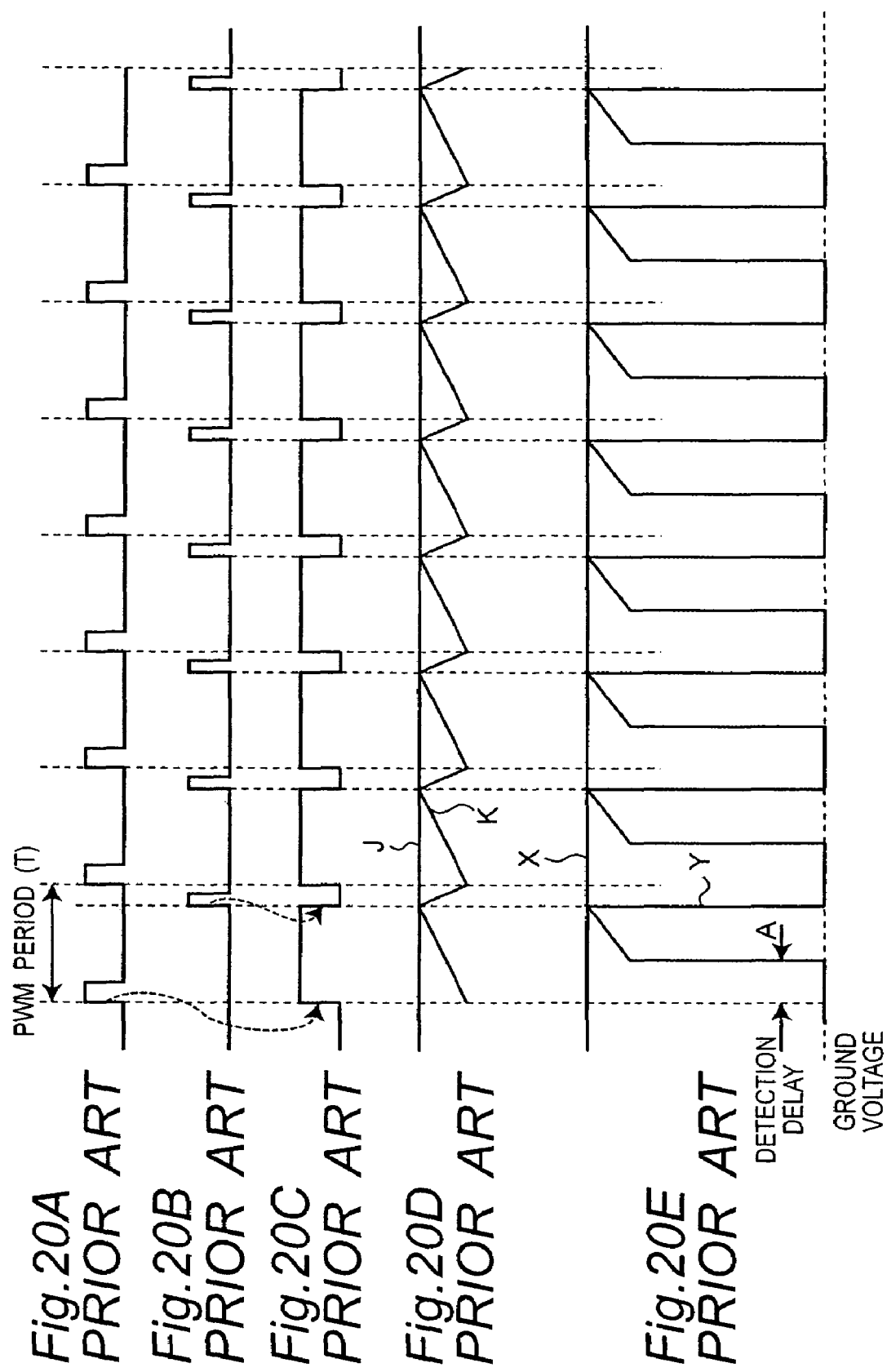

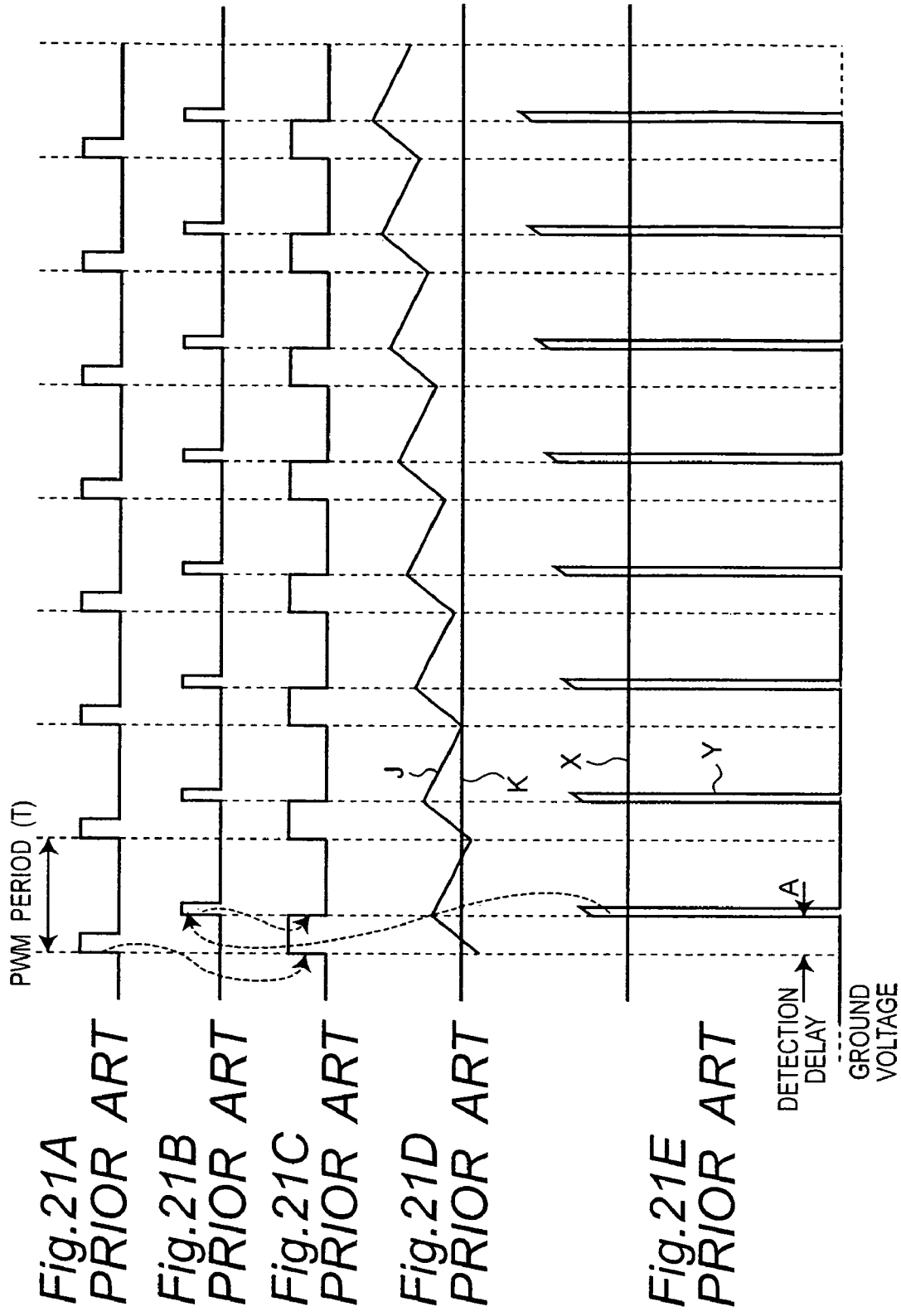

STEPPING MOTOR DRIVING APPARATUS AND STEPPING MOTOR DRIVING METHOD

BACKGROUND OF THE INVENTION

1. Field of the Invention

The invention relates to a technology of driving a stepping motor at low noise and low vibration.

2. Related Art

Hitherto, a stepping motor is used for applications in various position controls. A stepping motor is composed of a rotor and a stator having plural phases of windings and is arranged to rotate and stop by each unit angle. Control of the number of rotation steps allows the rotor to rotate or stop by a desired angle without feedback control. Such operational characteristic of the stepping motor is suited to position control application.

Recently, the stepping motor is used widely in adjustment of iris, focus or zoom as an optical system actuator in electronic imaging apparatus such as a digital still camera (DSC) or a digital video camera (DVC).

Operation of the stepping motor used in the digital video camera is particularly required to be low in noise and vibration. This is because noise generated by the stepping motor is captured by a built-in microphone to be recorded as noise, and vibration causes camera shake and lowered quality of recorded image. To meet such demand, driving technology of operating a stepping motor at low noise and low vibration is disclosed, for example, in patent document 1.

FIG. 15 is a block diagram of a conventional stepping motor driving apparatus disclosed in patent document 1. The diagram describes only constituent elements necessary for explaining the principle. Since the stepping motor has plural phases of winding and the construction is the same in each winding, only one phase of winding is shown.

The pulse width modulation controller 15 includes a comparator 16, a flip-flop 17, a reference pulse generator 18, and a conduction logic section 19. The reference pulse generator 18 sets the flip-flop 17 in every pulse width modulation period (PWM period). Hence the conduction logic section 19 turns on either one of transistors 6 and 9 and either one of transistors 7 and 8 which compose the switching section 5, in every specific period, in combination and timing so as not to shoot through. A current direction switch signal (PHASE in FIG. 15) entered into the conduction logic section 19 decides which one of transistors 6 and 9 and one of transistors 7 and 8 are turned on, and determines the direction of current flowing in the winding 3.

During turn-on of the transistors 6 to 9, electric power is supplied to the winding 3 from the power source 1, and the current flowing in the winding 3 increases. Hereinafter, the period in which the flip-flop 17 is set and electric power is supplied to the winding 3 with the increased current flowing in the winding 3 is called "PWM ON period".

A supplied current measuring section 20 detects the current supplied in the winding 3 by turn-on of transistors 6 to 9 from the power source 1, and outputs the detected current value to a comparator 16. The supplied current measuring section 20 includes a detection resistor 21, sense amplifier 22, and gain setting resistors 23 and 24. An amplifier 25 includes a sense amplifier 22 and a gain setting resistors 23 and 24, and the amplification factor of the amplifier 25, that is, the gain from input to output of sense amplifier 22 is determined by the gain setting resistors 23 and 24. The current supplied to the winding 3 flows into the detection resistor 21, and the voltage generated across the detection resistor 21 is fed into the sense amplifier 22. The sense amplifier 22 multiplies the input voltage by the gain to send the multiplied voltage to the comparator 16 as a detected current value.

In the following explanation of operation, the current flowing in the winding 3 to be detected by the supplied current measuring section 20 is called "a detected current value". The reference signal generator 14 generates stepwise waves increasing and decreasing in steps, and sends to the comparator 16 as a reference signal which indicates the current limit value. The reference signal expressing the current limit value generated by the reference signal generator 14 is a current target value for the winding 3.

The comparator 16 compares the entered detected current value with the current target value, and resets the flip-flop 17 when the detected current value exceeds the current target value. By resetting the flip-flop 17, the conduction logic section 19 turns off both transistors 7 and 8 for composing the switching section 5. While the flip-flop 17 is reset and transistors 7 and 8 are turned off, power supply from power source 1 to winding 3 is cut off, and the current flowing in the winding 3 is decreased by regenerative operation.

While both transistors 7 and 8 are turned off, if both transistors 6 and 9 are cut off, the current flowing in the winding 3 is regenerated by either one of the flywheel diodes 11 and 12, and either one of the flywheel diodes 10 and 13. While both transistors 7 and 8 are turned off, if both transistors 6 and 9 are turned on, the current flowing in the winding 3 is regenerated by transistors 6 and 9.

While both transistors 7 and 8 are turned off with either one of transistors 6 and 9 turned on, if the flywheel diode connected to the transistor not turned on is at forward bias, the regeneration current is caused by either one of flywheel diodes 11 and 12, and either one of transistors 6 and 9. If the flywheel diode connected to the transistor not turned on is at backward bias, the current regeneration is caused by either one of flywheel diodes 10 and 13, and either one of transistors 6 and 9.

A period for which the flip-flop 17 is reset and the current flowing in the winding 3 is decreasing by the regenerative operation is called "PWM OFF period". During PWM OFF period, the current flowing in the winding 3 decreases. However when the output signal of the reference pulse generator 18 sets the flip-flop 17 again, it is changed to PWM ON period, and the current flowing in the winding 3 begins to increase again.

By this operation, the average current supplied to the winding 3 gradually approaches the current target value. As the current target value increases or decreases stepwise, the average current supplied to the winding 3 increases or decreases stepwise, and the operation is the same in other phases of windings than winding 3, and therefore the stepping motor 2 rotates and operates at rotating speed depending on the speed of step advancing.

The current target value generated by the reference signal generator 14 is described. FIG. 16 is a diagram showing the relation of a reference signal and a current direction switch signal in a conventional stepping motor driving apparatus.

The reference signal generator 14 generates a stepwise wave which increases and decreases in steps, sends it to the comparator 16 as a current target value. As the current target value increase or decreases in steps, the stepping motor rotates by each unit angle. Step advance of the current target value is determined by input of CLK (clock signal) instructing the step advance, but it can be also determined by counting of step advance interval by a timer. The step advance period of the current target value is determined by input CLK period or period of a timer for determining the step advance interval. The period for advancing the step of the current target value determines the period of the stepping motor for rotating a unit angle is determined, and further the rotation period of the stepping motor is determined. The current target value is preferred to be a sinusoidal signal in terms of low noise and low vibration. The reference signal generator 14 generates a stepwise wave by sampling a sinusoidal wave.

FIG. 16 shows a stepwise wave sampled in 64 steps as a current target value. Along with advance in steps, each value of the stepwise wave obtained by sampling the sinusoidal wave at each step is outputted sequentially, resulting in the stepwise wave sampling the sinusoidal wave.

Current direction of a current flowing in the winding 3 is specified by a current direction switch signal as shown in FIG. 16. That is, each value of the stepwise wave shows the amount of the current target value, and the current direction switch signal shows the direction of current. Further, to avoid sudden current changes due to stepwise level change, the stepwise wave smoothed by integrating means such as low pass filter is sent to the comparator 16 as a current target value.

The stepwise wave sampling a sinusoidal wave is not always required. In terms of mounting area, a stepwise wave sampling pseudo-sinusoidal wave, or stepwise wave out of sinusoidal waves may be also used. If sudden current changes by stepwise level changes may be permitted, unsmoothed stepwise waves may be sent to the comparator 16.

\* \* \* Patent Document 1: JP-A-2004-215385

According to the conventional steeping motor driving apparatus, however, waveform of a current flowing in the winding 3 maybe distorted due to the response delay of the sense amplifier 22.

This problem is discussed by referring to FIG. 17 to FIG. 22B.

FIG. 17 is a circuit diagram of general sense amplifier structure and PWM OFF period operation point. The sense amplifier 22 include P channel MOS transistors 30a, 30b and 30c, N channel MOS transistors 31a, 31b and 31c, and differential transistors 32a and 32b, a current source 33, and a phase compensation capacitor 34. The gain setting resistors 23 and 24 have the same resistance value R, with the gain doubled.

FIG. 18 shows general sense amplifier structure and PWM ON period operation point. FIGS. 19A to 19C are current path diagrams when changing the phases (reference sign "35" in the diagram denotes a current path). FIGS. 20A to 20E are current waveform diagrams when the current target value is large in the conventional stepping motor driving apparatus. FIGS. 21A to 21E are current waveform diagrams when the current target value is small in the conventional stepping motor driving apparatus. FIG. 22A and 22B are waveform diagrams showing current waveform distortion in the conventional stepping motor driving apparatus.

During PWM OFF period, because of regenerative operation explained above, a current does not flow in the detection resistor 21. As a result, a grounding voltage is supplied to the non-inverting input terminal of the sense amplifier 22, as shown Vin+=0 V in FIG. 17.

The sense amplifier 22 cannot output a voltage lower than the minimum voltage determined by a constant current flowing from P channel MOS transistor 30c and ON resistance of N channel MOS transistor 31c. Even if an amplifier of so-called rail-to-rail type is used, 0 V cannot be outputted when the minimum voltage of the sense amplifier 22 is 0 V.

In FIG. 17, the minimum voltage is 20 mV, and Vout is 0.02 V. At this time, a half voltage, that is, 10 mV is fed to the non-inverting input terminal of the sense amplifier 22 owing to its structure, showing in FIG. 17 as Vin−=0.01 V. In the state shown in FIG. 17, relation of virtual grounding of the sense amplifier 22 is broken, and differential transistors 32a and 32b are not in balanced state, and a voltage nearly equal to the voltage of power source 1 is applied to the phase compensation capacitor 34. FIG. 17 shows it as Vc=VCC.

Hereinafter, the state in which relation of virtual grounding is broken is called that the loop of the sense amplifier is out. An electric charge of [Ccomp×(VCC−20 mV)] is accumulated in the phase compensation capacitor 34, where Ccomp is the capacitance of the phase compensation capacitor 34.

FIG. 18 shows an operation point of the sense amplifier during PWM ON period. In PWM ON period, since a current flows in the detection resistor 21, a voltage determined by the current flowing in detection resistor 21 and resistance of the detection resistor 21 is applied to the non-inverting input terminal of the sense amplifier 22. In FIG. 18, it is shown as Vin+=0.2 V. At inverting terminal of the sense amplifier 22, 0.2 V is fed, and the sense amplifier 22 outputs 0.4 V.

In FIG. 18, Vin− is 0.2 V and Vout is 0.4 V. At this time, the relation of virtual grounding of the sense amplifier 22 is maintained, and the differential amplifiers 32a and 32b are in balanced state. A gate voltage Vgs1 of N channel MOS transistor 31c is applied to the phase compensation capacitor 34, so that the voltage determined by a constant current flowing from P channel MOS transistor 30c and ON resistance of N channel MOS transistor 31c may be 0.4 V. FIG. 18 shows it as Vc=Vgs1.

Hereinafter, the state in which the relation of the virtual grounding is maintained is called that the loop of the sense amplifier is maintained. An electric charge of [Ccomp×(Vgs1−0.4 V)] is accumulated in the phase compensation capacitor 34.

Even when a voltage is supplied from the detection resistor 21, if the loop of the sense amplifier is out, the sense amplifier 22 does not respond and the detected current value cannot be judged correctly. To judge the detected current value correctly after transition from PWM OFF period to PWM ON period, it is required to transfer from the operation point shown in FIG. 17 to that shown in FIG. 18, and in particular, the electric charge in the phase compensation capacitor 34 is a problem.

As mentioned above, an electric charge of [Ccomp×(VCC−20 mV)] is accumulated at the operation point shown in FIG. 17, and an electric charge of [Ccomp×(Vgs1−0.4 V)] is accumulated at the operation point in FIG. 18. The detected current value cannot be judged correctly unless an electric charge of [Ccomp×4.4 V] is discharged, where VCC=5.02 V and Vgs1=1.0 V. The time required for discharge is the time until the sense amplifier 22 can correctly judge the detected current value after transition from PWM OFF period to PWM ON period, and it becomes hence "a detection delay".

Such discharge is caused by a difference in currents flowing in the N channel MOS transistor 31b and the differential transistor 32b. As the differential transistor 32b is turned off more completely (as the larger voltage is input to the non-inverting terminal of the sense amplifier 22 after transition to PWM ON period, the differential transistor 32b is turned off more completely), the required discharge time becomes shorter, and the detection delay is reduced.

To the contrary, as the input voltage to the non-inverting terminal of sense amplifier 22 is smaller after the transition to PWM ON period, that is, as the current flowing in the detection resistor 21 is smaller, the differential transistor 32b is turned off more poorly, and the required discharge time becomes longer, with the detection delay being longer. Therefore, the detection delay appears more significantly at driving steps of the smaller current target value, such as driving steps=0, 31 to 33, 63 shown in FIG. 16. Since the driving step of the small current target value is close to the point of inverting the polarity of current, this is called "zero cross" hereinafter. In FIG. 16, the zero cross is indicated by point A.

In PWM OFF period explained above, the loop of the sense amplifier is out, and the loop of the sense amplifier may not be out also in PWM ON period.

The operation when the loop of the sense amplifier is out in PWM ON period is explained by referring to FIG. 16 and FIGS. 19A to 19C.

In PWM ON period, as shown in FIG. 19A, power is supplied to the winding 3, and a current flows into the supplied current measuring section 20. In FIG. 19A, transistors 8 and 9 turn on, and transistors 6 and 7 turn off. In PWM OFF period, on the other hand, because of the regenerative operation as shown in FIG. 19B, a current does not flow into the supplied current measuring section 20. In FIG. 19B, the transistor 9 turn on, and the transistors 6, 7 and 8 turn off. In PWM OFF period shown in FIG. 19B, the current flowing in the winding 3 attenuates. But at driving step=32 or 0 shown in FIG. 16, since the current is small, the voltage applied across the winding 3 is small in PWM OFF period, and hence the current flowing in the winding 3 hardly deteriorates.

When the advancing time of driving steps is short, that is, when the rotating speed of the stepping motor is fast, the current of winding 3 does not attenuate fully to 0 in transition to the next driving step. When the driving step transits from 32 to 33 or from 0 to 1 with the current left over in the winding 3, the current direction switch signal is changed over and the current at the winding 3 is inverted. Hence, transistors different from that in one driving step before turn on, as shown in FIG. 19C. In FIG. 19C, the transistors 8 and 9 turn off, and the transistors 6 and 7 turn on. At this time, the current at the winding 3 flows from the ground to the power source, and the current flows into the supplied current measuring section 22 reversely from the ground, and the current further flows into the detection resistor 21 reversely from the ground.

As a result, a negative potential is generated across the detection resistor 21, and is also applied in the sense amplifier 22. When the negative potential is applied, the loop of the sense amplifier is out with the same reason as in the case of input of grounding potential mentioned above, and the detection delay occurs. Therefore, as indicated by A in FIG. 16, right after changeover of the current direction switch signal PHASE, that is, immediately before inversion of a current of the winding 3, the loop of the sense amplifier is out even after the transition to PWM ON period, and the detection delay occurs.

Current waveform in the case of the detection delay is explained by referring to FIG. 20 and FIG. 21. In FIG. 20 and FIG. 21, the portion indicated by A is the detection delay. In FIG. 20, during the detection delay, the detected current value does not exceed the current target value. In this case, if there is a detection error, there is no adverse effect on detection operation.

When the attenuation in PWM OFF period is large, it takes a long time until reaching the current target value after the transition to PWM ON period. Thus the actual current does not reach the current target value during the detection delay, and it is highly possible that adverse effect does not occur as shown in FIG. 20. The higher the current target value, the larger is the attenuation in the regenerative operation in PWM OFF period, and at driving step of high current target value, the effect is none or very small.

In FIG. 21, during the detection delay, the detected current value is over the current target value. In this case, since the detection is not conducted during the detection delay, although the current exceeds the current target value, the PWM ON period continues, and hence it is out of the current target value. When the attenuation in PWM OFF period is small, it takes only a short time to reach the current target value after the transition to PWM ON period. Thus the actual current reaches the current target value within the detection delay, and hence it is highly possible that adverse effects occur as shown in FIG. 21.

The lower the current target value, the smaller is the attenuation in the regenerative operation in PWM OFF period, and it is highly possible that adverse effects occur at driving step of the low current target value. It means, particularly near zero cross, that the waveform is distorted obviously due to deviation from the target current. That is, as shown in portion A in FIG. 22, near zero cross, the current is deviated to the larger side from the current target value, and the waveform is distorted.

Thus, according to the conventional stepping motor driving apparatus, due to the detection delay of the sense amplifier, obvious distortion of the waveform may occur near zero cross in particular. Due to the waveform distortion, vibration and noise cannot be decreased sufficiently in application, more particularly, to an electronic imaging apparatus, and there is a further demand for lower vibration and lower noise of the stepping motor operation.

The invention is directed to the above problems, and hence has an object to present a stepping motor driving apparatus and method capable of lowering vibration and noise in operation of the stepping motor.

SUMMARY OF THE INVENTION

In a first aspect of the invention, a stepping motor driving apparatus includes a detector operable to detect a current supplied to a winding included in the stepping motor, a first offset adding section operable to add an offset to the output of the detector, an amplifier operable to amplify the output of the first offset adding section, a reference signal generator operable to generate a reference signal which indicates a current limit, a second offset adding section operable to add an offset to the output of the reference signal generator, a switching section operable to supply a power to the winding when the switching section is turned on, and cut off a power to the winding when the switching section is turned off, and a PWM controller operable to turn on the switching section every predetermined period, and turn off the switching section when the output of the amplifier exceeds the output of the second offset adding section.

In a second aspect of the invention, a stepping motor driving apparatus includes a detector operable to detect a current supplied to a winding included in the stepping motor, a first offset adding section operable to add an offset to the output of the detector, an amplifier operable to amplify the output of the first offset adding section, an offset subtracting section operable to subtract an offset from the output of the amplifier, a reference signal generator operable to generate a reference signal which indicates a current limit, a switching section operable to supply a power to the winding when the switching section is turned on, and cut off a power to the winding when the switching section is turned off, and a PWM controller operable to turn on the switching section every predetermined period, and turn off the switching section when the output of the offset subtracting section exceeds the current limit indicated by the reference signal.

In a third aspect of the invention, a stepping motor driving apparatus includes a detector operable to detect a current supplied to a winding included in the stepping motor, a first offset adding section operable to add an offset to the output of the detector, an amplifier operable to amplify the output of the first offset adding section, a reference signal generator operable to generate a reference signal which indicates a current limit, a switching section operable to supply a power to the winding when the switching section is turned on, and cut off a power to the winding when the switching section is turned off, and a PWM controller operable to turn on the switching section every predetermined period, and turn off the switching section when the output of the amplifier exceeds the current limit indicated by the reference signal.

In a fourth aspect of the invention, a stepping motor driving apparatus includes a detector operable to detect a current supplied to a winding included in the stepping motor, a first offset adding section operable to add an offset to the output of the detector, a selector operable to select and output either one of the output of the detector and the output of the first offset adding section, an amplifier operable to amplify the output of the selector, a reference signal generator operable to generate a reference signal which indicates a current limit, a switching section operable to supply a power to the winding when the switching section is turned on, and cut off a power to the winding when the switching section is turned off, a PWM controller operable to turn on the switching section every predetermined period, and turn off the switching section when the output of the amplifier exceeds the current limit indicated by the reference signal, and a selector drive signal generator operable to control the selector.

The selector drive signal generator judges turn-off of the switching section by the PWM controller, and outputs the judging result. The selector receives the judging result from the selector drive signal generator, and selects and output either one of the output of the detector and the output of the first offset adding section based on the received result.

In the stepping motor driving apparatus of the forth aspect, the selector may select, based on the judging result, the output of the first offset adding section in whole period in which the switching section is in turn-off state, and select the output of the detector in whole period in which the switching section is in turn-on state.

Alternatively, the selector may select the output of the first offset adding section in a part of period in which the switching section is in turn-off state, and select the output of the detector in the remaining period in which the switching section is turn-off state and in whole period in which the switching section is in turn-on state.

Alternatively, the selector may select the output of the first offset adding section in a part of period in which the switching section is in turn-on state and whole period in which the switching section is in turn-off state, and select the output of the detector in the remaining period in which the switching section is in turn-on state.

Alternatively, the selector may select the output of the first offset adding section in a part of period in which the switching section is in turn-on state and in a part of period in which the switching section is in turn-off state, and select the output of the detector in the remaining period in which the switching section is in turn-on state and in the remaining period in which the switching section is in turn-off state.

Furthermore, the selector drive signal generator may further judge that changeover of a winding current direction is instructed, and output the judging result. In this case, the selector may select, based on the judging result, the output of the first offset adding section in whole period in which the switching section is in turn-off state and in a predetermined period after the changeover of a winding current direction is instructed, and select the output of the detector in a period determined by reducing the predetermined period from a whole period in which the switching section is in turn-on state.

Alternatively, the selector may select the output of the first offset adding section in a part of period in which the switching section is in turn-off state and in a predetermined period after the changeover of a winding current direction is instructed, and select the output of the detector in a period determined by reducing the predetermined period from the remaining period in which the switching section is turn-off state and a whole period in which the switching section is in turn-on state.

Alternatively, the selector may select the output of the first offset adding section in a part of period in which the switching section is in turn-on state, in whole period in which the switching section is in turn-off state, and in a predetermined period after the changeover of a winding current direction is instructed, and select the output of the detector in a period determined by reducing the predetermined period from the remaining period in which the switching section is in turn-on state.

Alternatively, the selector may select the output of the first offset adding section in a part of period in which the switching section is in turn-on state, in a part of period in which the switching section is in turn-off state, and in a predetermined period after the changeover of a winding current direction is instructed, and select the output of the detector in a period determined by reducing the predetermined period from the remaining period in which the switching section is in turn-on state and the remaining period in which the switching section is in turn-off state.

In a fifth aspect of the invention, a stepping motor driving method includes detecting a current supplied to a winding included in a stepping motor, adding a first offset to the detected current, amplifying the detected current with the added offset, generating a reference signal which indicates a current limit, adding a second offset to the reference signal, and controlling turn-on and turn-off of a switching section, the switching section being operable to supply a power to the winding when the switching section is turned on, and cut off a power to the winding when the switching section is turned off. The controlling turns on the switching section every predetermined period, and turn off the switching section when the amplified current exceeds the reference signal with the added second offset.

In a sixth aspect of the invention, a stepping motor driving method includes detecting a current supplied to a winding included in a stepping motor, adding a first offset to the detected current, amplifying the detected current with the added offset, subtracting a second offset from the amplified current, generating a reference signal which indicates a current limit, and controlling turn-on and turn-off of a switching section, the switching section being operable to supply a power to the winding when the switching section is turned on, and cut off a power to the winding when the switching section is turned off. The controlling turns on the switching section every predetermined period, and turn off the switching section when the current subtracted with the second offset exceeds the current limit indicated by the reference signal.

In a seventh aspect of the invention, a stepping motor driving method includes detecting a current supplied to a winding included in a stepping motor, adding an offset to the detected current, amplifying the detected current with the added offset, generating a reference signal which indicates a current limit, and controlling turn-on and turn-off of a switching section, the switching section being operable to supply a power to the winding when the switching section is turned on, and cut off a power to the winding when the switching section is turned off. The controlling turns on the switching section every predetermined period, and turn off the switching section when the amplified current exceeds the current limit indicated by the reference signal.

In an eighth aspect of the invention, a stepping motor driving method includes detecting a current supplied to a winding included in a stepping motor, adding an offset to the detected current, selecting either one of the current with the added offset and the detected current without the offset, amplifying the selected current, generating a reference signal which indicates a current limit, and turning on a switching section every predetermined period, and turning off the switching section when the amplified current exceeds the current limit indicated by the reference signal. The selecting judges turn-off of the switching section and selects the current based on the judging result.

According to a stepping motor driving apparatus and method of the invention, adding the offset to the input of the detecting section can remove the detection delay and prevent waveform distortion, in particular, near the zero cross. Further the second offset is added in order to cancel the offset inputted to the detecting section, and thus the deviation of detected current caused by the added offset to the detecting section can be prevented. Reduction of the detection delay and prevention of the waveform distortion can achieve lower vibration and lower noise in the stepping motor.

BRIEF DESCRIPTION OF THE DRAWINGS

FIG. 2A shows a waveform of an output of a reference pulse generator. FIG. 2B shows a waveform of a comparator output. FIG. 2C shows a waveform of a flip flop output. FIG. 2D shows waveforms of an output ("J") of a reference signal generator (target current) and a winding current ("K"). FIG. 2E shows waveforms of an output (X) of a reference signal generator with offset added (target current), an output ("X'") of the reference signal generator (target current), and an output ("Y") of a supplied current measuring section (detected current).

FIGS. 9A to 9D are diagrams of example of an offset subtracting section in the second embodiment of the invention.

FIG. 10 is a block diagram of a structure of a stepping motor driving apparatus in a third embodiment of the invention.

FIGS. 19A to 19C are current path diagrams in phase changeover (commutation).

FIGS. 20A to 20E are current waveform diagrams with large current target value in the conventional stepping motor driving apparatus. FIG. 20A shows a waveform of an output of a reference pulse generator. FIG. 20B shows a waveform of a comparator output. FIG. 20C shows a waveform of a flip flop output. FIG. 20D shows a waveform of an output ("J") of a reference signal generator (target current) and a winding current ("K"). FIG. 20E shows waveforms of an output (X) of a reference signal generator (target current) and an output ("Y") of a supplied current measuring section (detected current).

FIGS. 21A to 21E are current waveform diagrams with small current target value in the conventional stepping motor driving apparatus. FIG. 21A shows a waveform of an output of a reference pulse generator. FIG. 21B shows a waveform of a comparator output. FIG. 21C shows a waveform of a flip flop output. FIG. 21D shows waveforms of an output ("J") of a reference signal generator (target current) and a winding current ("K"). FIG. 21E shows waveforms of an output (X) of a reference signal generator (target current) and an output ("Y") of a supplied current measuring section (detected current).

DETAILED DESCRIPTION OF THE PREFERRED EMBODIMENTS

Figure 1:
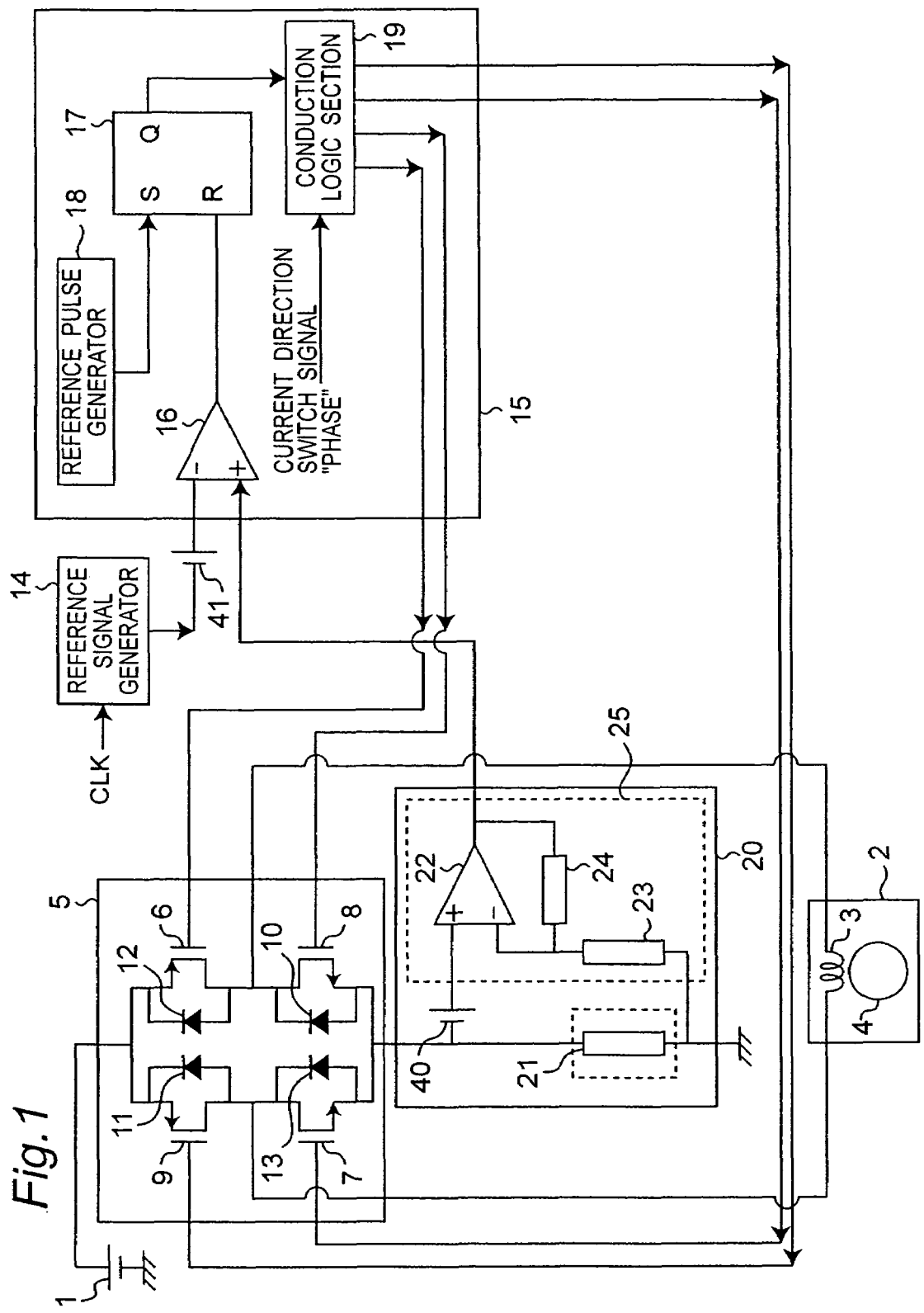
FIG. 1 is a block diagram of a structure of a stepping motor driving apparatus in a first embodiment of the invention.

Preferred embodiments of the invention are described specifically below with reference to the accompanying drawings. In the following explanation, same members and parts as mentioned above are identified with same reference numerals, and detailed description is omitted.

First Embodiment

The stepping motor driving apparatus in the first embodiment of the invention is described below with reference to FIG. 1 and FIG. 16, and FIG. 2A to FIG. 7.

FIG. 1 is a block diagram of a stepping motor driving apparatus in the first embodiment. A stepping motor has plural phases of windings, and elements provided for a winding are identical in each phase. Thus the following explanation is made for elements provided for one phase of winding.

Figure 16:
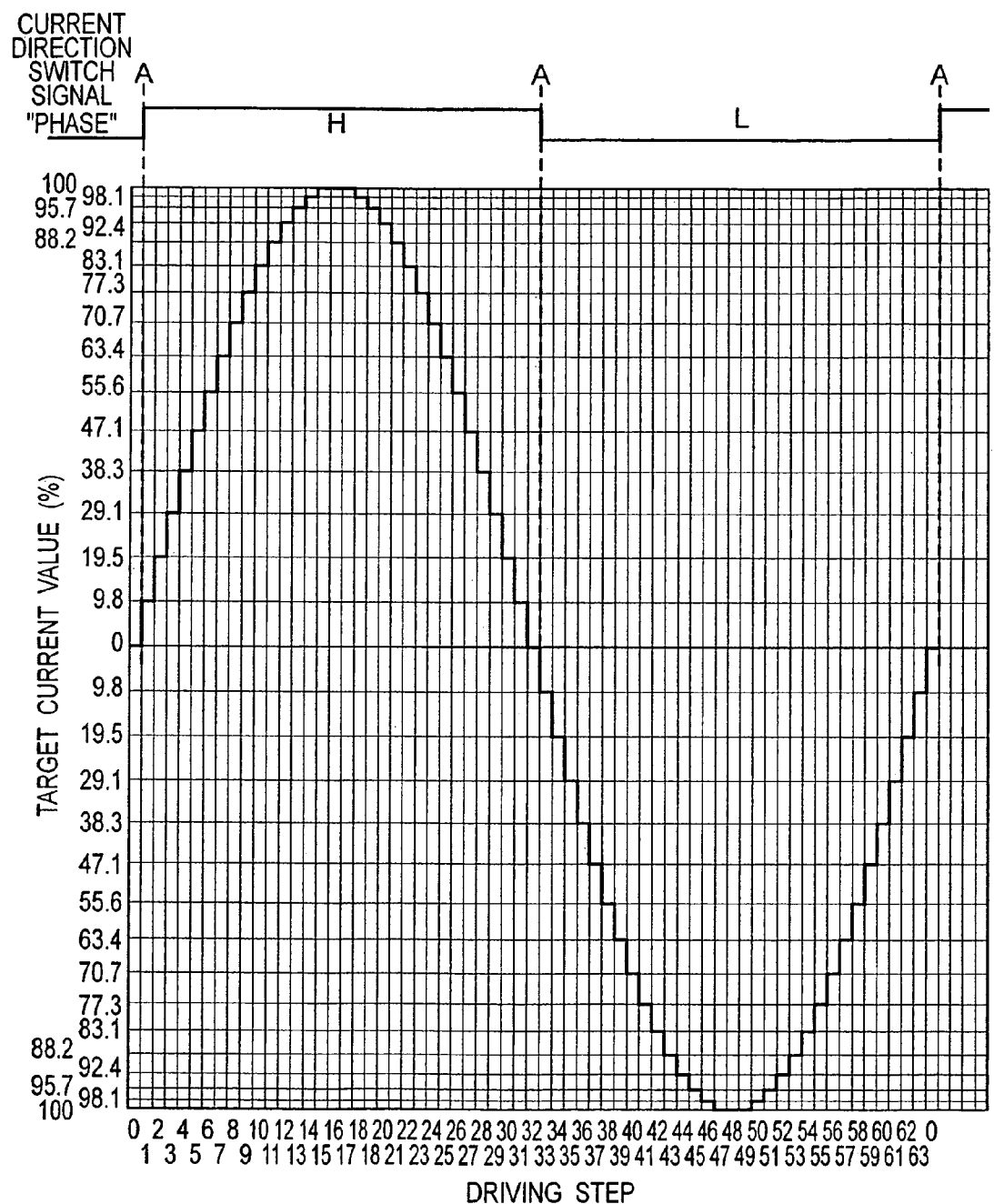
FIG. 16 is a diagram of reference signal and current direction switch signal in conventional stepping motor driving apparatus.

FIG. 16 is a diagram showing the relation of a reference signal and a current direction switch signal PHASE in conventional stepping motor driving apparatus. The reference signal and current direction switch signal PHASE of the embodiment are same as in the prior art.

In FIG. 1, the stepping driving apparatus receives a power from a power source 1 and drives a stepping motor 2. The stepping motor which is a target to be controlled includes a winding 3 and a rotor 4.

The stepping motor driving apparatus includes a switching section 5 for controlling power supply to the winding 3, a reference signal generator 14 for generating a reference signal indicating a current limit, a pulse width modulation (PWM) controller 15, and supply current measuring section 20.

The switching section 5 includes transistors 6 to 9 and flywheel diodes 10 to 13 which form a current path. The PWM controller 15 includes a comparator 16, a flip-flop 17, a reference pulse generator 18, and a conduction logic section 19.

The stepping motor driving apparatus in the first embodiment performs pulse width modulation (PWM) control, more specifically, performs PWM control in a current chopper method such that the average current supplied to the winding 3 approaches gradually the current limit value generated by the reference signal generator 14. In the following explanation of operation, the current flowing in the winding 3 which is detected by the supplied current measuring section 20 is called a "detected current value", and the reference signal expressing the current limit generated by the reference signal generator 14 is called a "current target value".

The current target value generated by the reference signal generator 14 is explained. Operation of the reference signal generator 14 is same as in the conventional stepping motor driving apparatus, and generates a stepwise wave increasing and decreasing in steps to output it as the current target value. As the current target value increases or decreases in steps, the stepping motor rotates by each unit angle. Advance of steps of the current target value is determined by input of CLK for instructing the step advance, but same effects are obtained by measuring of step advance intervals by a timer.

The period of advancing the step of the current target value is determined by the input CLK period, or the timer period for determining the step advance interval. Depending on the period of advancing the step of the current target value, the period of stepping motor rotating by unit angle is determined, and thus the period of rotation of the stepping motor is determined. The current target value is preferred to be a sinusoidal signal from the viewpoint of low noise and low vibration. The reference signal generator 14 generates a stepwise wave obtained by sampling the sinusoidal wave.

FIG. 16 shows a stepwise wave sampled in 64 steps as a current target value. Along with advance in steps, each value of the stepwise wave sampling the sinusoidal wave at each step is provided sequentially, resulting in a stepwise wave sampling the sinusoidal wave.

Current direction of a current flowing in the winding 3 is specified by the current direction switch signal PHASE as shown in FIG. 16. That is, the size of the stepwise wave shows the size of the current target value, and current direction switch signal PHASE shows a current direction. Further, to avoid sudden current changes by stepwise level changes, the stepwise wave smoothed by integrating means such as a low pass filter is sent as the current target value.

The stepwise wave by sampling sinusoidal wave is not always required, but from the viewpoint of mounting area, a stepwise wave by sampling pseudo-sinusoidal wave, or a stepwise wave other than a sinusoidal wave may be also used. If sudden current changes by stepwise level changes may be permitted, an unsmoothed stepwise wave may be also outputted.

The PWM controller 15 includes the comparator 16, flip-flop 17, reference pulse generator 18, and conduction logic section 19, and performs PWM control for the current of the winding.

Operation by PWM control is explained specifically by referring to FIGS. 2A to 2E. FIGS. 2A to 2E show temporal changes of principal signals relating to PWM control operation, together with current waveform of the stepping motor driving apparatus.

The reference pulse generator 18 outputs a signal of a specific period for instructing start of power supply to the winding 3 to the set terminal of the flip-flop 17 to set the flip-flop every specific period. As the flip-flop 17 is set, the conduction logic section 19 receiving the output signal of the flip-flop 17 provides the transistors 6 to 9 with a gate signal for turning on or off the transistors, such that either one of transistors 6 and 9 and either one of transistors 7 and 8 for composing the switching section 5 turns on in combination and timing not to cause penetration to the ground from the power source. Then the power supply to the winding 3 is started and the current flowing in the winding 3 increases.

The current direction switch signal PHASE entered in the conduction logic section 19 decides which one of transistors 6 and 9 and which one of transistors 7 and 8 are turned on, that is, the direction of the current flowing in the winding 3. A period in which the flip-flop 17 is set and the current flowing in the winding 3 increases due to supply of electric power to the winding 3 is called "PWM ON period". In every signal of specific period generated by the reference pulse generator 18, power feed to the winding 3 is started, causing transition to the PWM ON period. Hence the specific period generated by the reference pulse generator 18 acts as the PWM period.

The gate signals for turning on the transistors are supplied to the transistors 6 and 7 and the gate signal for turning off the transistors are supplied to the transistors 8 and 9. For this case, the current path in PWM ON period is shown in current path 42 in FIG. 3A. In FIG. 3A, a current flows from the power source 1 to the ground by way of the transistor 6, winding 3, transistor 7, and supplied current measuring section 20, and thus the power is supplied from the power source 1 to the winding 3.

In this embodiment, the supplied current measuring section 20 is disposed between the ground and the switching section 5 to detect the current flowing to the ground by way of the supplied current measuring section 20. But the supplied current measuring section 20 can be disposed between the power source 1 and the switching section 5 to detect the current flowing from the power source 1 through the supplied current measuring section 20. In this case, the same effects as in the embodiment can be obtained.

In this case, however, the detected current value and current target value are not based on the ground, but are based on the power source 1, and the magnitude relation of detected current value and current target value is opposite to the relation when based on the ground.

In FIG. 3A, the current flowing in the winding 3 flows in the current path 42 and is detected by the supplied current measuring section 20. The supplied current measuring section 20 outputs the detected current value flowing in the winding 3. Right after transition to PWM ON period, the detected current value may include overshoot.

Overshoot occurs mainly when a discharge current of parasitic capacitor of the switching section 5, for example, a current due to discharge of electric charge of a parasitic capacitor between the drain and gate of the transistor 7, flows into the supplied current measuring section 20. Therefore, if the supplied current measuring section 20 and comparator 16 follow the overshoot, even though the current of the winding 3 is not actually higher than the current target value, the detected current value may be falsely detected to exceed the current target value, because of the overshoot.

In such a case, during a specific time (called "mask time") involving possible occurrence of overshoot, the current detection by the supplied current measuring section 20 and comparator 16 is masked. In the embodiment, a set-priority flip-flop is used as the flip-flop 17, and the pulse width of the signal output from the reference pulse generator 18 is adjusted to a pulse width corresponding to the mask time to mask the current detection. That is, while the reference pulse generator 18 is outputting a pulse width corresponding to the mask time, even if the comparator 16 detects falsely by overshoot, the flip-flop 17 operates on set-priority principle and is not reset. During the mask time, fixing of the output of the supplied current measuring section 20 or the output of the comparator 16 can provide the same effects.

The comparator 16 receives a signal showing the detected current value and a signal showing the current target value. In the embodiment shown in FIG. 1, the signal showing the detected current value is the output of the supplied current measuring section 20, and the signal showing the current target value is the sum of the current target value output from the reference signal generator 14 and an offset by the second offset adding section 41. Operation and effect of the second offset adding section 41 are specifically described later.

The comparator 16 compares the input signal that shows the detected current value with the signal showing the current target value, and resets the flip-flop 17 when the signal showing the detected current value is higher than the signal showing the current target value, and starts regenerative operation. The period in which the flip-flop 17 is reset and a current flowing in the winding 3 is reduced by the regenerative operation is called "PWM OFF period".

In this embodiment, the relation of set and reset of the flip-flop 17 and PWM ON period and PWM OFF period are controlled, so that PWM ON period starts by setting of the flip-flop 17 and PWM OFF period starts by resetting of the flip-flop 17. But the relation may be controlled reversely, the same effects as in the embodiment can be obtained.

The conduction logic section 19 resets the flip-flop 17 to supply a gate signal for turning off the transistor to the transistors 7 and 8. When both transistors 7 and 8 are turned off, the period is transferred to PWM OFF period, power feed to the winding 3 is cut off, and the current flowing in the winding 3 begins to decrease due to the regenerative operation. FIG. 3B shows a current path in PWM OFF period with the transistors 6 and 7 turned on just before transfer to PWM OFF period.

In FIG. 3B, the current flowing in the winding 3 by regeneration flows through the flywheel diode 11 and transistor 6 and decreases. In PWM OFF period, both transistors 6 and 9 can be turned on for the purpose of decreasing ripple of the current flowing in the winding 3 by reducing decrement amount of the current flowing in the winding 3. Power consumption by the flywheel diode 11 is replaced by power consumption by ON resistance of the transistor 9, and decreases, so that the decrement amount of current flowing in the winding 3 in PWM OFF period can be reduced. The current path in this case is shown as a current path 42 in FIG. 3C.

In FIG. 3C, the current flowing in the winding 3 by regeneration flows through transistors 6 and 9 to decrease. During PWM OFF period, both transistors 6 and 9 can be turned off to quickly decrease the current flowing in the winding 3. The current path in this case is shown as a current path 42 in FIG. 3D.

In FIG. 3D, the current flowing in the winding 3 by regeneration flows through the flywheel diodes 10 and 11 to decrease. In the embodiment, the flywheel diodes 10 to 13 are provided, but they may be replaced by body diodes composed of back gate and drain of transistors 6 to 9. In order to lessen the decrement amount of the current flowing in the winding 3 during PWM OFF period, Schottky barrier diodes can be used instead of flywheel diodes 10 to 13.

After transition to PWM OFF period due to reset of the flip-flop 17, the reference pulse generator 18 sets the flip-flop 17 every specific period, repeating the same operation. Repeat of current increase during PWM ON period and current decrease during PWM OFF period, the average current supplied to the winding 3 gradually approaches the current target value. As the current target value increases and decreases in steps, the average current supplied to the winding 3 increases and decreases in steps, and the windings of other phases than winding 3 operate similarly, and the stepping motor 2 rotates at a rotating speed corresponding to the advance speed of the step.

Structure and operation of the supplied current measuring section 20 are explained. The supplied current measuring section 20 detects the current supplied from the power source 1 to the winding 3 by transistor 6 to 9 turned on to output it as the detected current value.

The supplied current measuring section 20 in the embodiment includes a detection resistor 21 as detecting means (detector), an amplifier 25 as amplifying means, and a first offset adding section 40. The amplifier 25 is composed of a sense amplifier 22 and gain setting resistors 23 and 24, and the amplification factor of the amplifier 25, that is, the gain from input to output of the sense amplifier 22 is determined by the gain setting resistors 23 and 24.

Figure 4:
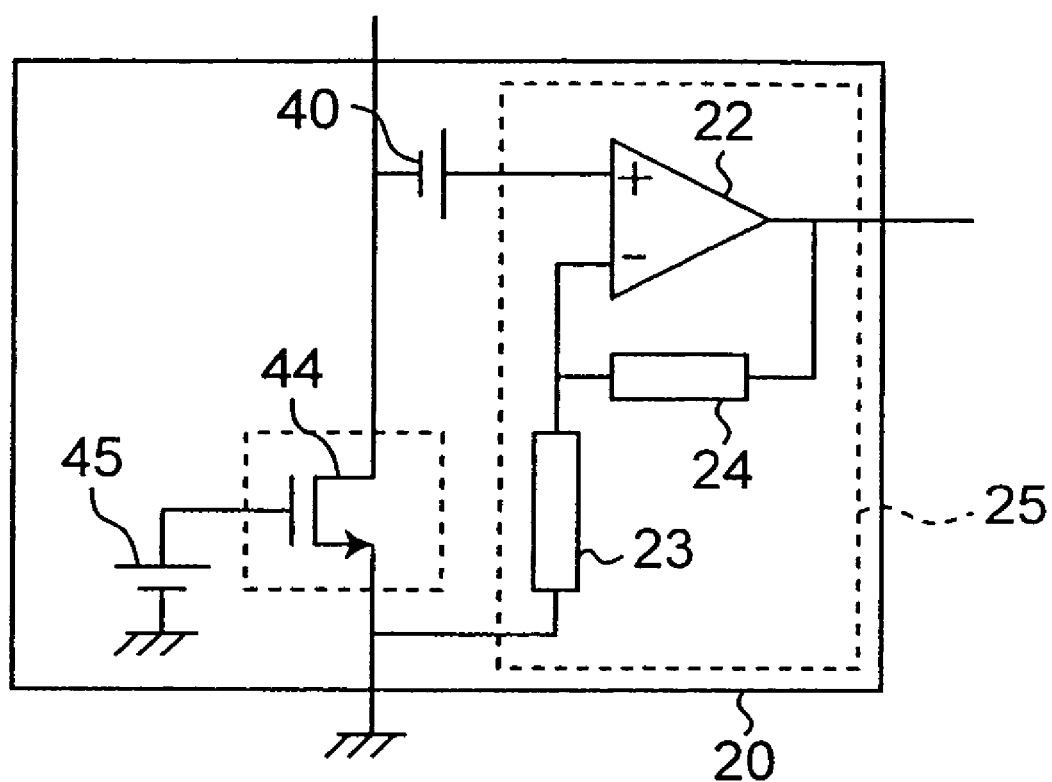
FIG. 4 is a diagram of example of a detecting section in the first embodiment of the invention.

In FIG. 1, the detection resistor 21 is used as detecting means. However instead of detection resistor 21, as shown in FIG. 4, using the ON resistance of MOS transistor 44 generated when a voltage 45 is applied to the gate can be used, the same effect as in detection resistor 21 in FIG. 1 can be obtained. The current supplied to the winding 3 flows into the ground through the detection resistor 21, and generates a voltage across the detection resistor 21 which is determined by the resistance of the detection resistor 21 and the flowing current. The first offset adding section 40 adds an offset to the voltage across the detection resistor 21. The voltage with the added offset is supplied to the non-inverting input terminal (+) of the sense amplifier 22 composing the amplifier 25. The sense amplifier 22, that is, the amplifying means 25 amplifies the input voltage with a gain and outputs the amplified voltage to the comparator 16 as the detected current value.

With reference to FIGS. 5A to 5D, a specific example of offset addition by the first offset adding section 40 is described.

Figure 5A:
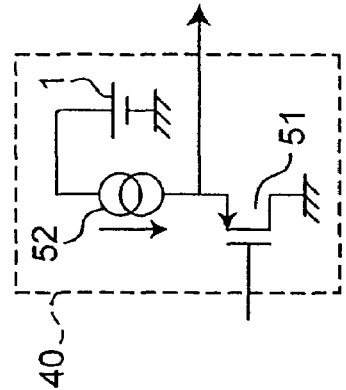
FIGS. 5A to 5D are diagrams of example of a first offset adding section in the first embodiment of the invention.

In FIG. 5A, the first offset adding section 40 is composed of the resistor 47 and current source 48. The voltage determined by the resistance of the resistor 47 and the current value of the current source 48 is the offset to be added. A diode can be used instead of the resistor 47.

Figure 5B:
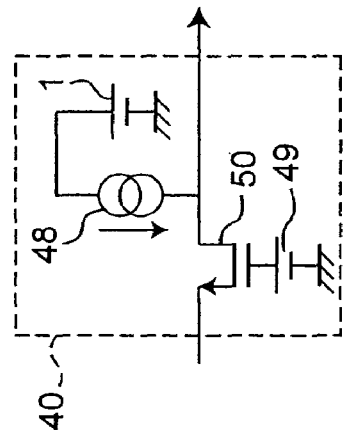

In FIG. 5B, the first offset adding section 40 is composed of a current source 48, a gate applied voltage 49, and a MOS transistor 50. The offset to be added is sum of ON resistance of the MOS transistor 50 determined by the gate applied voltage 49 and the voltage determined by the current value of the current source 48. The MOS transistor 50 can be realized by either P channel MOS transistor or N channel MOS transistor.

Figure 5C:
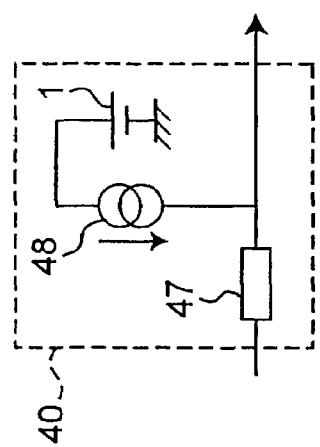

In FIG. 5C, the first offset adding section 40 is achieved by a source follower by a MOS transistor 51 and a current source 52 a voltage between the gate and source is the offset. Instead of the source follower by MOS transistor 51, the emitter follower by a bipolar transistor may be used.

Figure 5D:
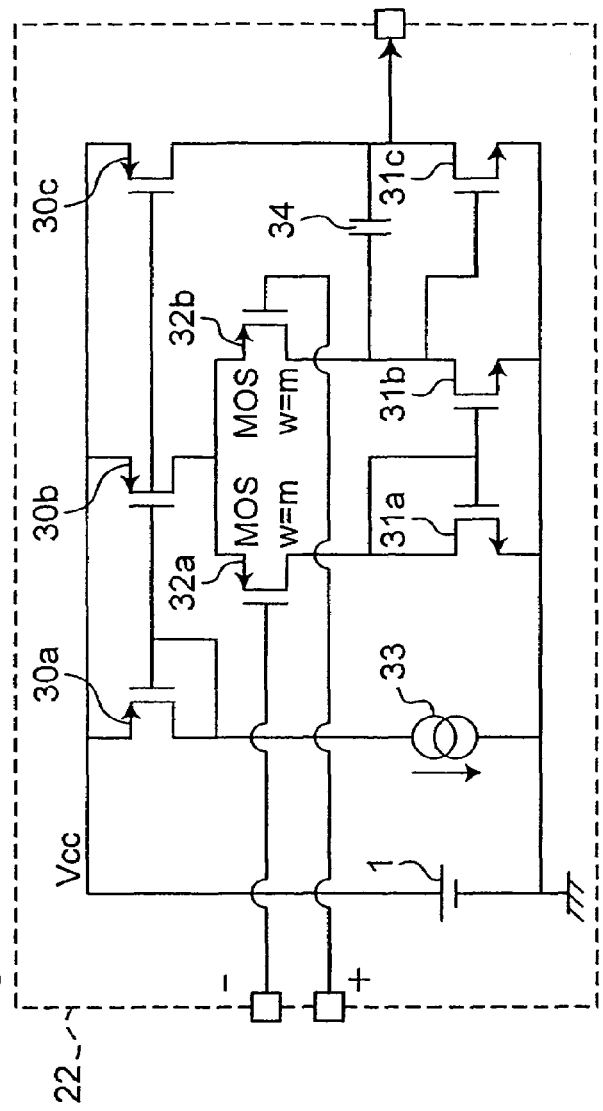

In FIG. 5D, the sense amplifier 22 is composed of P channel MOS transistors 30a to 30c, N channel MOS transistors 31a to 31c, differential transistors 32a and 32b, and a current source 33. The first offset adding section 40 is composed of differential transistors 32a and 32b for composing the sense amplifier 22. The offset occurring due to difference in size or number of pieces of differential transistor 32a and 32b is the offset to be added. Instead of generating the offset by difference in size or number of pieces, the offset can be also generated by unbalancing the currents flowing in the differential transistors 32a and 32b by controlling a current flowing either one of the differential transistors 32a and 32b.

FIGS. 5A to 5D showing the first offset adding section, the second offset adding section has the same structure as the first offset adding section. However, in a specific example of FIG. 5D, the sense amplifier 22 should be replaced with the comparator 16 for the second offset adding section.

Figure 6:
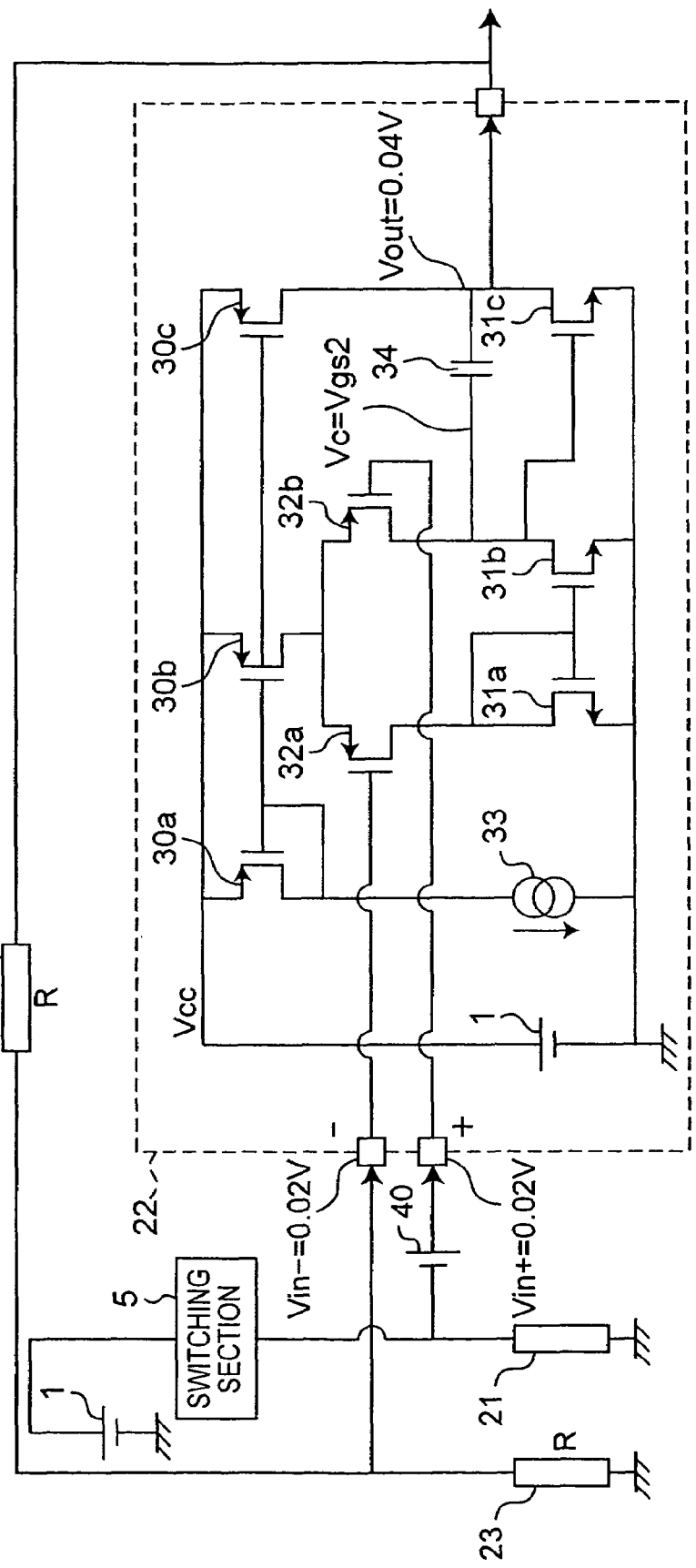
FIG. 6 is a diagram of a sense amplifier structure and PWM OFF period operation point in the first embodiment of the invention.
Figure 7:
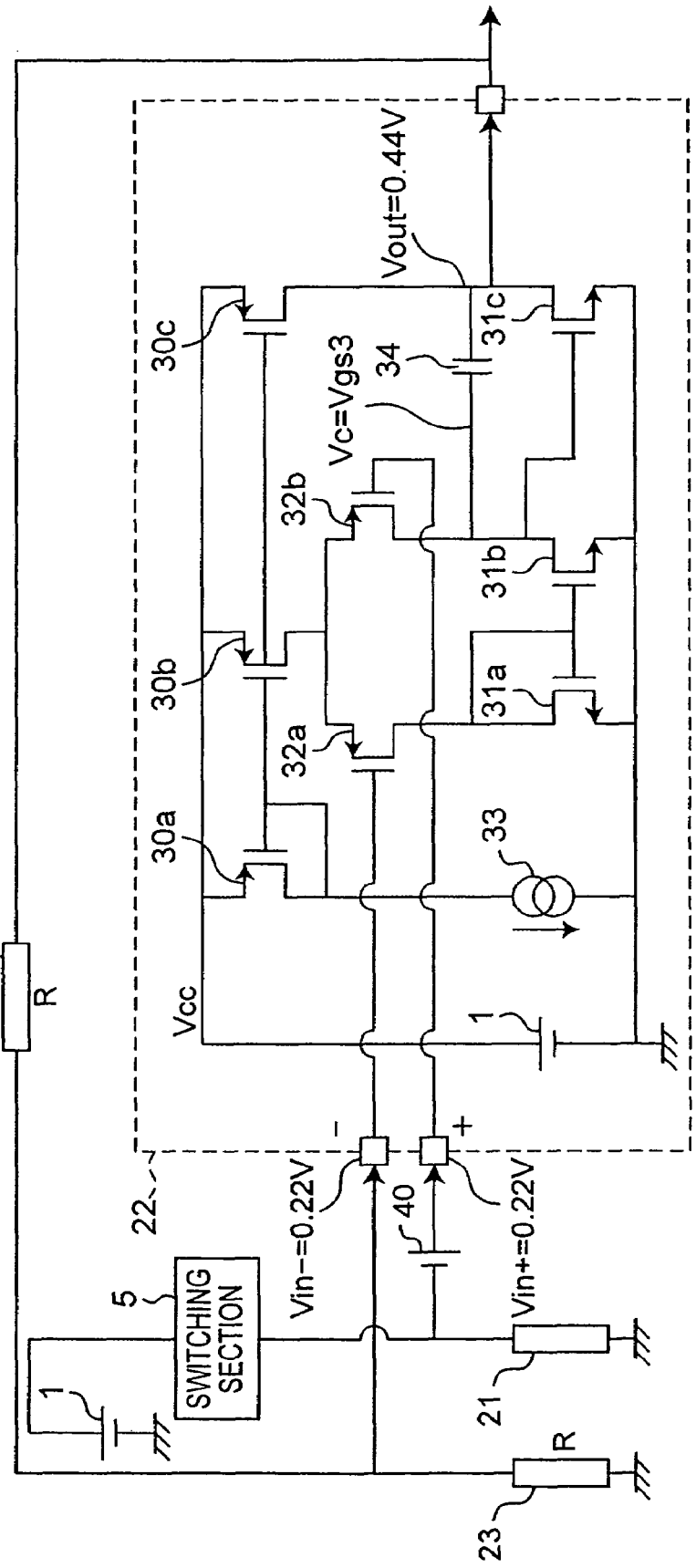
FIG. 7 is a diagram of a sense amplifier structure and PWM ON period operation point in the first embodiment of the invention.

FIG. 6 shows the PWM OFF period operation point when the offset is added by the first offset adding section 40, and FIG. 7 shows the PWM ON period operation point. Referring to FIG. 6 and FIG. 7, the operation of the sense amplifier when the offset is added by the first offset adding section is explained.

In FIG. 6 and FIG. 7, the gain setting resistors 23 and 24 are identical in resistance value R, and then the gain becomes twice. In PWM OFF period, since the regenerative operation is conducted, a current does not flow in the detection resistor 21. At this time, the voltage across the detection resistor 21 is the grounding voltage.

In FIG. 6, the offset by the first offset adding section 40 is 20 mV. Therefore, a voltage 20 mV as the sum of the voltage across the detection resistor 21 and the offset by the first offset adding section 40 is fed to the non-inverting input terminal of the sense amplifier 22, as showing Vin+=0.02 V in FIG. 6. A voltage 0.02 V is fed to the inverting input terminal of the sense amplifier 22 which in turn produces 0.04 V, as showing Vout=0.04 V in FIG. 6.

Herein, the sense amplifier 22 cannot produce a voltage equal to or less than the minimum voltage which is determined by the constant current flowing from the P channel MOS transistor 30c and the ON resistance of N channel MOS transistor 31c. In the case of amplifier of so-called rail-to-rail type, if the minimum voltage of the sense amplifier 22 is 0 V, it cannot produce an output of 0 V.

Figure 17:
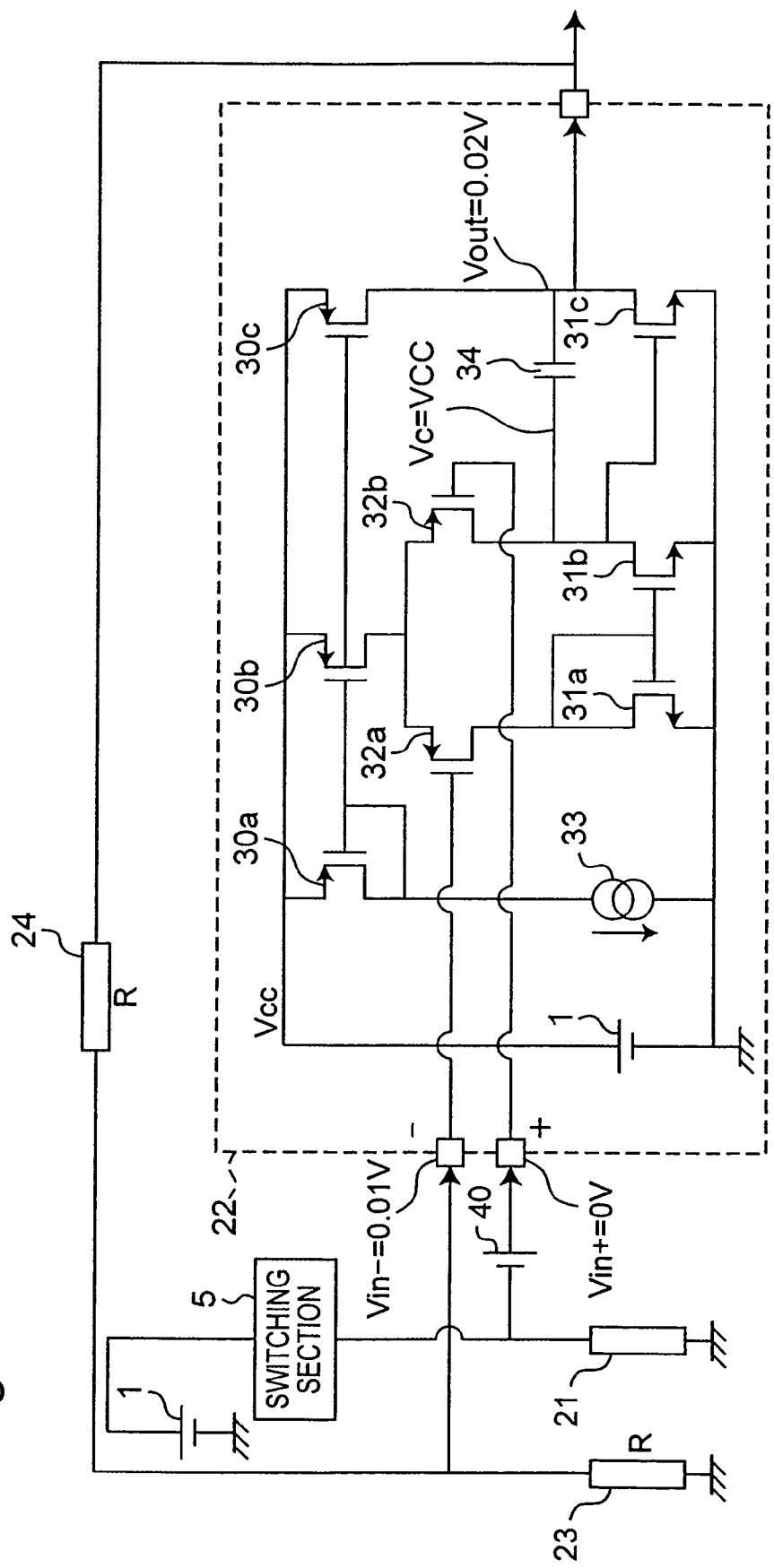
FIG. 17 is a diagram of a general sense amplifier structure and PWM OFF period operation point.

In the conventional stepping motor driving apparatus shown in FIG. 17, during PWM OFF period, the output of the sense amplifier 22 is the minimum voltage of 20 mV. At this time, the relation of virtual grounding of the sense amplifier 22 is broken, and the differential amplifiers 32a and 32b are not in a balanced state, and a voltage nearly equal to the voltage of the power source 1 is applied to the phase compensation capacitor 34.

On the other hand, in FIG. 6 showing the embodiment, because of the offset by the first offset adding section 40, the output of the sense amplifier 22 is 40 mV higher than the minimum voltage of 20 mV, maintaining the relation of virtual grounding of the sense amplifier 22. At this time, since the differential amplifiers 32a and 32b are in the balanced state, a gate voltage Vgs2 of N channel MOS transistor 31c is applied to the phase compensation capacitor 34, so that the voltage determined by the constant current flowing from the P channel MOS transistor 30c and the ON resistance of N channel MOS transistor 31c becomes 0.04 V. A state in which the relation of virtual grounding is maintained is called "the loop of the sense amplifier is maintained", while a state in which the relation of virtual grounding is broken is called "the loop of the sense amplifier is out". In FIG. 6, an electric charge of [Ccomp×(Vgs2−0.04 V)] is accumulated in the phase compensation capacitor 34.

PWM ON period operation point is shown in FIG. 7. During PWM ON period, since a current flows in the detection resistor 21, the voltage across the detection resistor 21 is a voltage determined by the current flowing in the detection resistor 21 and the resistance of the detection resistor 21. When the voltage across the detection resistor 21 is 0.2 V and the offset by the first offset adding section 40 is 20 mV, a voltage 0.22 V is fed to the non-inverting input terminal of the sense amplifier 22 as the sum of the voltage across the detection resistor 21 and the offset by the first offset adding section 40, as showing in FIG. 7 Vin+=0.22 V.

A voltage 0.22 V is fed to the inverting input terminal of the sense amplifier 22 which in turn produces 0.44 V, as showing in FIG. 7 Vin−=0.22 V and Vout=0.44 V. At this time, too, the relation of virtual grounding of the sense amplifier 22 is maintained, and the differential amplifiers 32a and 32b are in the balanced state, and the phase compensation capacitor 34 is provided with a gate voltage Vgs3 of N channel MOS transistor 31c, so that the voltage determined by the constant current flowing from the P channel MOS transistor 30c and the ON resistance of N channel MOS transistor 31c is 0.44 V. FIG. 7 shows Vc=Vgs3. An electric charge of [Ccomp×(Vgs3−0.44 V)] is accumulated in the phase compensation capacitor 34.

In the embodiment shown in FIG. 6, also during PWM OFF period, the loop of sense amplifier is maintained, and thus in transition from PWM OFF period to PWM ON period, no transition occurs from the loop out state of the sense amplifier to the loop maintaining state. In order to maintain the loop of the sense amplifier even during PWM OFF period as in the embodiment, the offset "OFFSET" by the first offset adding section 40 is at least required to satisfy the condition by the following formula (1)

$$\text{OFFSET} \geq \text{Vmin}/\alpha \quad (1)$$

where α is amplification factor of the amplifier 25, and Vmin is minimum output voltage by the sense amplifier 22.

More specifically, it is required to add a margin in consideration of variations of each value in formula (1) and offset by the sense amplifier 22.

As mentioned above, an electric charge of [Ccomp×(Vgs2−0.04 V)] is accumulated at the operation point shown in FIG. 6, and an electric charge of [Ccomp×(Vgs3−0.44 V)] is accumulated at the operation point shown in FIG. 7. Considering from the square characteristics of input gate voltage and current in MOS transistor, there is no significant difference between Vgs2 and Vgs3, and hence it is approximately assumed to be Vgs2=Vgs3.

Figure 18:
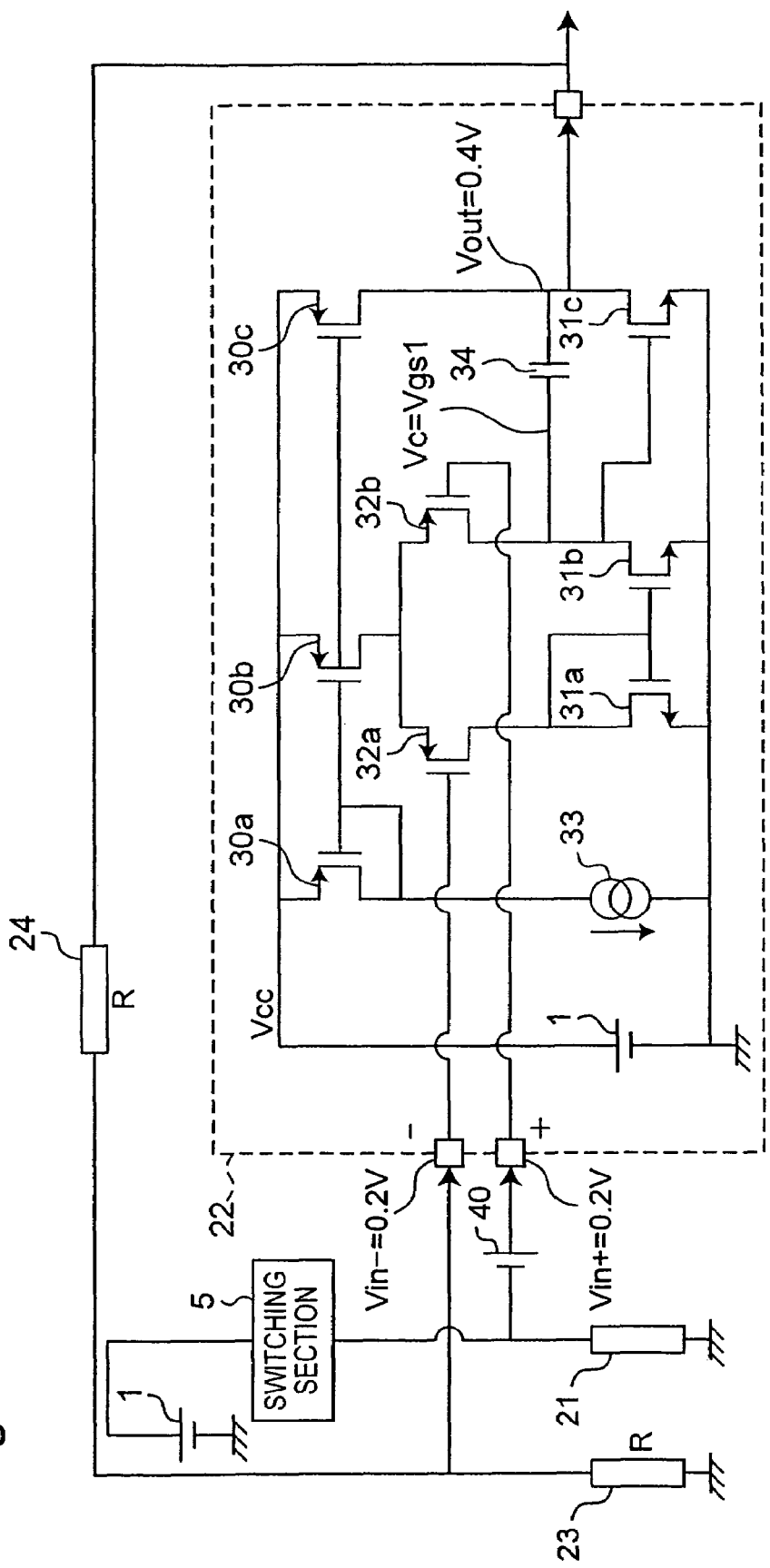
FIG. 18 is a diagram of general sense amplifier structure and PWM ON period operation point.
Figures 22A, 22B:
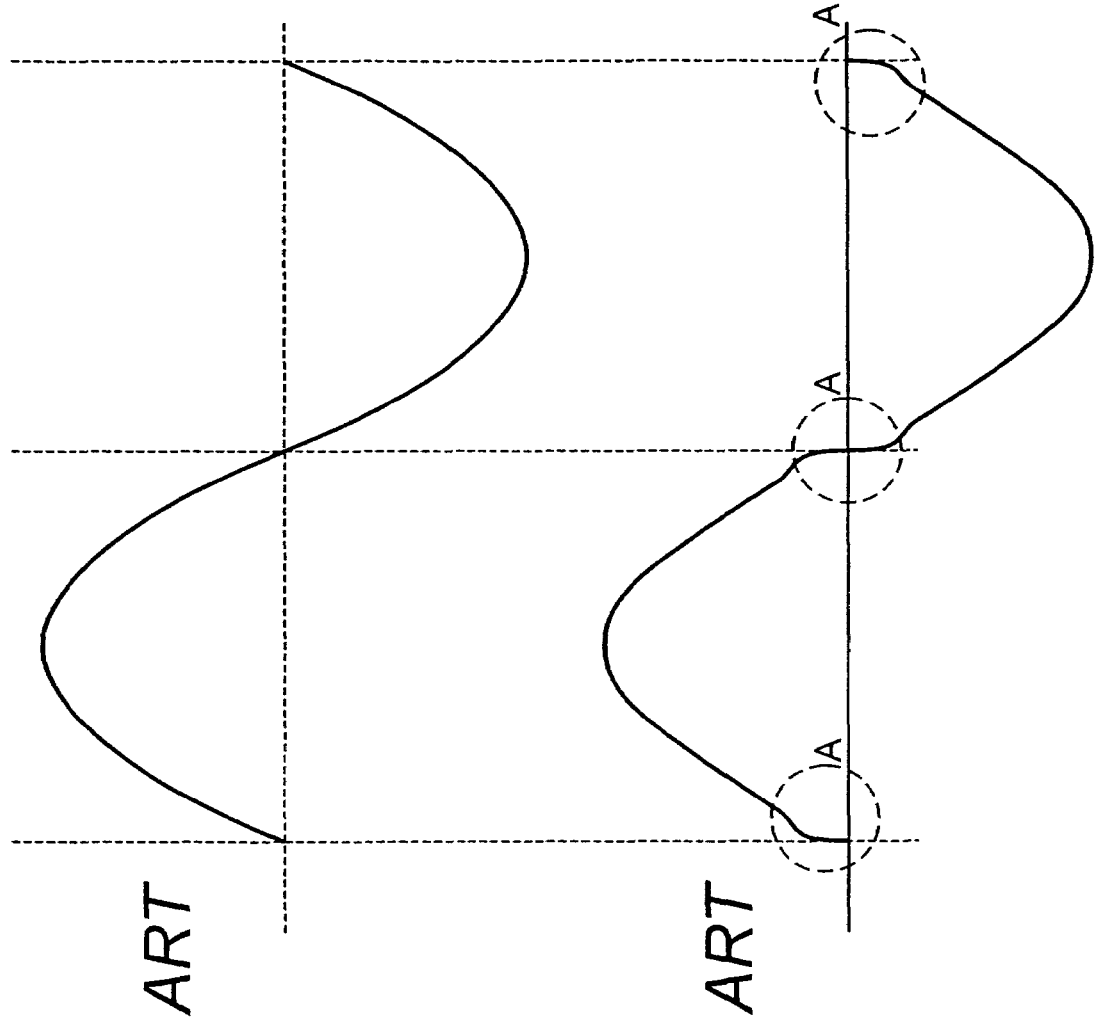
FIG. 22A shows an ideal current waveform and FIG. 22B shows a current waveform with distortion, in the conventional stepping motor driving apparatus.

At this time, the electric charge of the phase compensation capacitor 34 that must be discharged at the time of transition from PWM OFF period to PWM ON period is [Ccomp×0.4 V], which is about 1/10 smaller as compared with the electric charge [Ccomp×4.4 V] in the prior art shown in FIG. 17 and FIG. 18. Further, when the current is smaller and the voltage across the detection resistor 21 is smaller, the electric charge to be discharged becomes further smaller.

For example, when the voltage across the detection resistor 21 is 0.1 V, the electric charge to be discharged in the prior art is [Ccomp×4.2 V], and the electric charge [Ccomp×0.2 V] in the embodiment which is about 1/20 smaller. As mentioned above, the time required for discharge is equal to time until the sense amplifier 22 comes to judge the detection current value correctly after the transition from PWM OFF period to PWM ON period, which is a detection delay. In the embodiment, the electric charge to be discharge is small, and as a result no detection delay occur. Therefore, the detection delay can be eliminated, and in particular waveform distortion near the zero cross can be prevented.

As explained above about the conventional stepping motor driving apparatus, when the current direction switch signal PHASE is changed over with the remaining current of the winding 3 and then the current of the winding 3 is inverted, the current of the winding 3 flows from the ground into the power source. At this time, the current flows reversely into the sense amplifier 22 from the ground, and then the current flows reversely also into the detection resistor 21 from the ground. As a result, a negative potential is generated across the detection resistor 21. The condition shown in formula (1) is provided for the voltage across the detection resistor 21 corresponding to the grounding voltage. To eliminate the detection delay also for the negative potential, it is required to satisfy the condition by the following formula (2)

$$\text{OFFSET} \geq \text{Vmin}/\alpha + \text{Vneg} \quad (2)$$

wherein α is the amplification factor of the amplifier 25, OFFSET is the offset by the first offset adding section 40, Vmin is the minimum voltage produced by the sense amplifier 22, and Vneg is the maximum negative potential generated across the detection resistor.

The first offset adding section 40 adds the offset that satisfies the formula (2). Hence the detection delay can be eliminated and waveform distortion can be prevented even when the current direction switch signal PHASE is changed over to invert the current of winding 3.

Second offset adding section 41 connected to the PWM controller 15 is explained. By the offset added by the first offset adding section 40, the detected current value outputted from the supplied current measuring section 20 may be actually deviated from the value corresponding to the current value flowing in the detection resistor 21.

Figure 2:
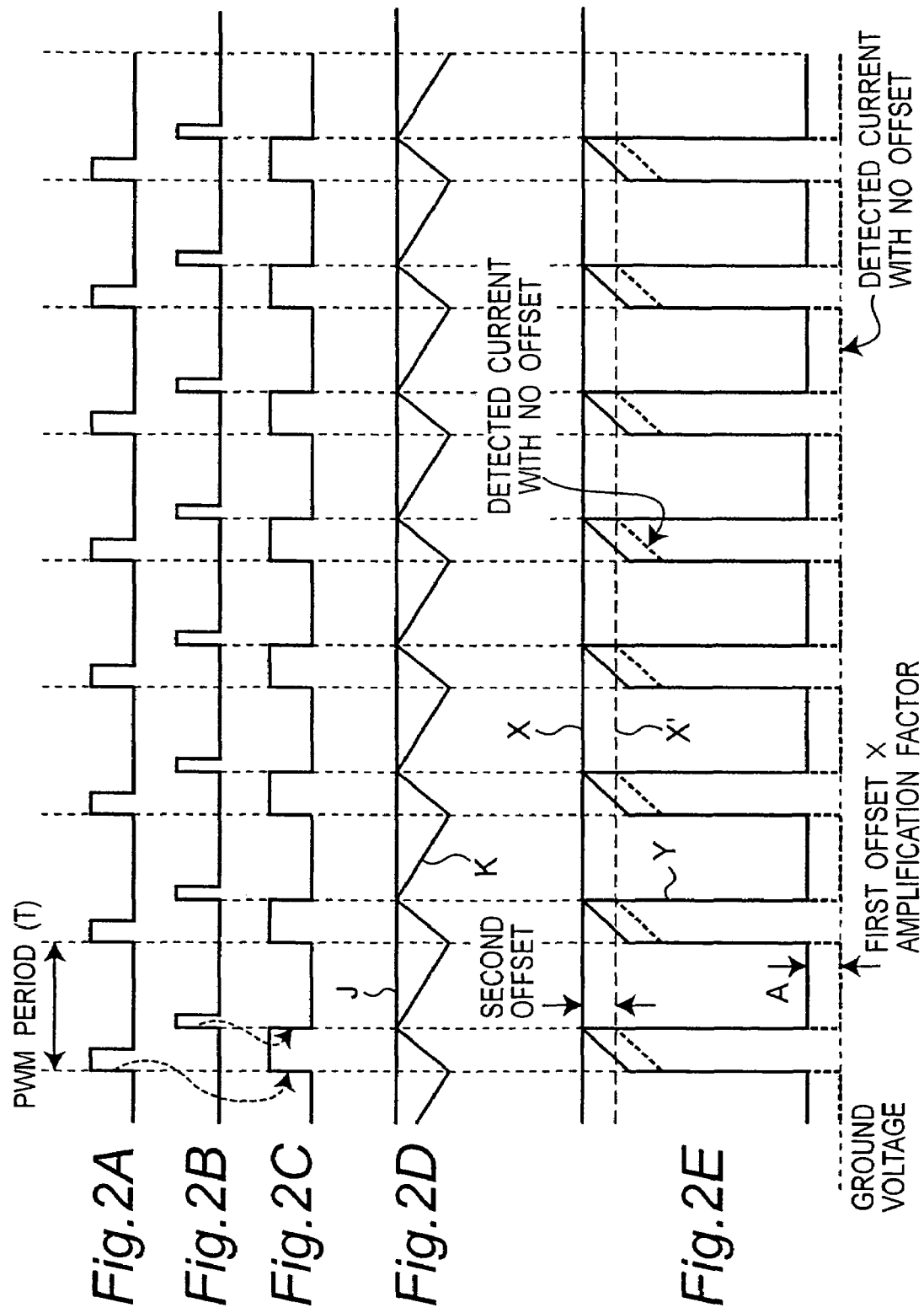
FIGS. 2A to 2E are current waveform diagrams of the stepping motor driving apparatus in the first embodiment of the invention.
Figure 3:
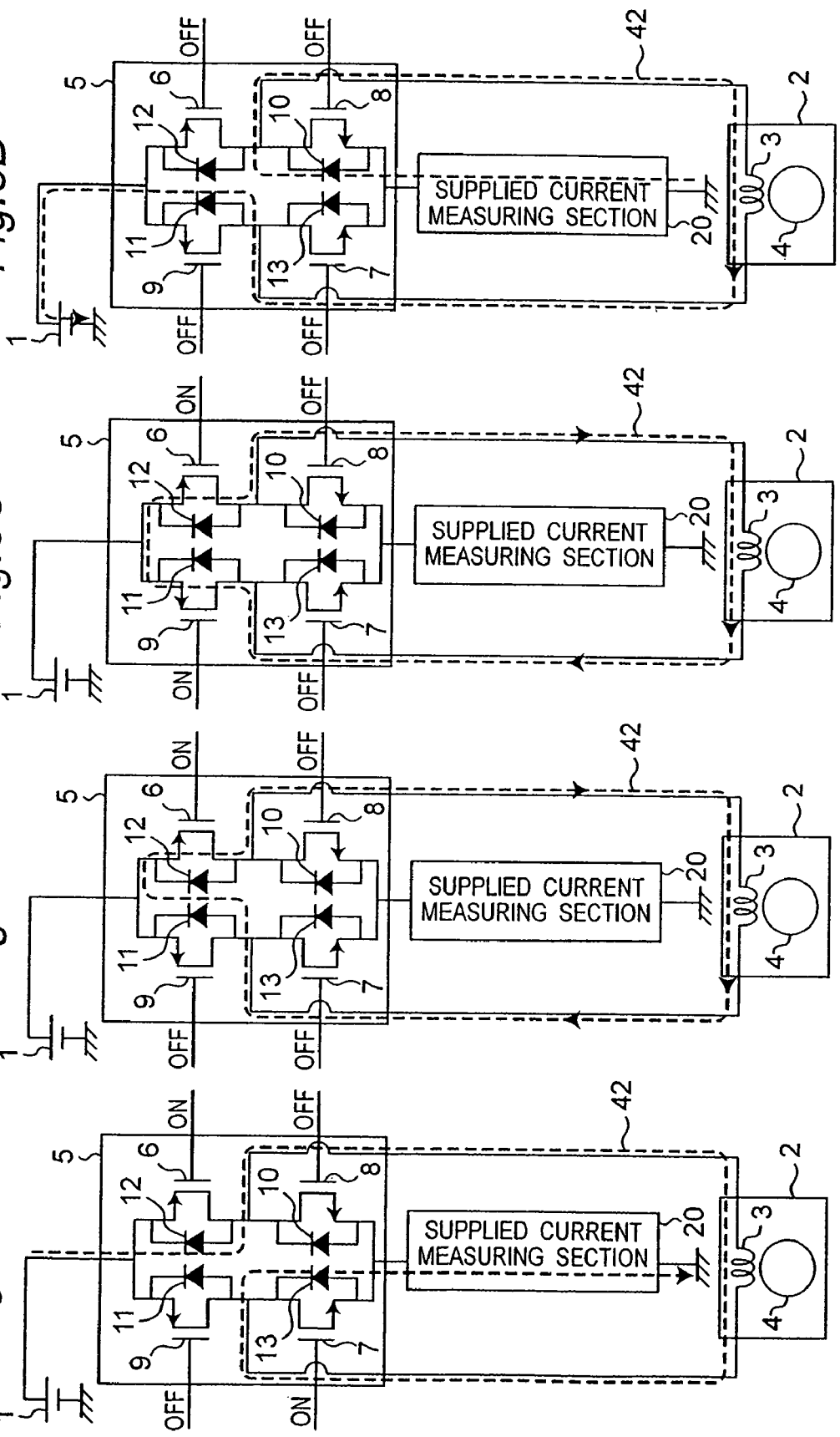
FIGS. 3A to 3D show a current path of the stepping motor driving apparatus in the first embodiment of the invention.

In FIG. 2, the solid line denotes the detected current value after addition of the offset, and the dotted line is the detection current value before addition of the offset. As shown in part A in FIG. 2, even during PWM OFF period with no current flowing, the output of the supplied current measuring section does not become the grounding voltage because of the offset.

In the embodiment, to prevent the current flowing in the winding 3 from deviating from the current target value due to the offset added by the first offset adding section 40, the offset by the second offset adding section 41 is added to the current target value. As indicated by the solid line in FIG. 2E, the output from the supplied current measuring section 20, that is, the output from the amplifier 25 is deviated from the value corresponding to the current value flowing actually in the detection resistor 21 indicated by the lower dotted line, by the product of the offset added by the first offset adding section 40 and the amplification factor of the amplifier 25.

By setting the offset of the current target value provided by the second offset adding section 41 equal to the product of the offset added by the first offset adding section 40 and the amplification factor of the amplifier 25, both the current target value fed actually to the comparator 16 and the current detected value are deviated by the same value. Thus the differential value fed to the comparator 16 is same as the value without either offset. Accordingly, the magnitude judgment of current target value and current detected value by the comparator 16 is same as when the offset is not provided, and detected current deviation due to the added offset can be prevented.

As explained herein, according to the stepping motor driving apparatus of the first embodiment, addition of the offset to the input of the sense amplifier 22 allows the detection delay to be eliminated, and in particular waveform distortion near zero cross to be prevented. Further, addition of the second offset to cancel the offset added to the input of the sense amplifier 22 allows deviation of detected current due to added offset to be prevented. As a result, low noise and low vibration in the stepping motor driving apparatus of the embodiment can be realized.

Second Embodiment

Figure 8:
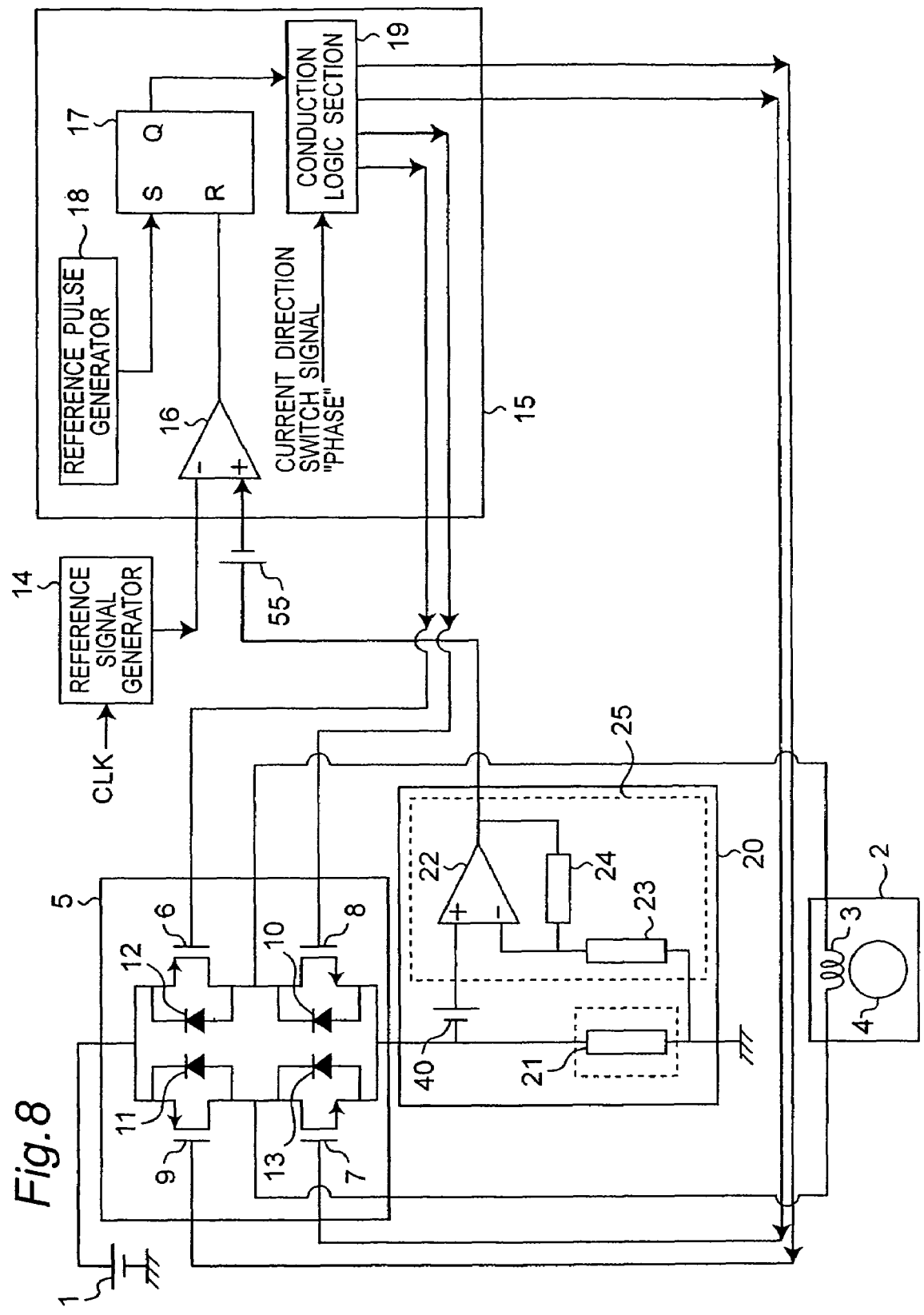
FIG. 8 is a block diagram of a structure of a stepping motor driving apparatus in a second embodiment of the invention.

The stepping motor driving apparatus in a second embodiment of the invention is similar to that in the first embodiment, except that offset subtracting section is provided instead of the second offset adding section of the first embodiment. Referring to FIG. 8 and FIG. 9, mainly the difference from the first embodiment is explained, and the same operations as in the first embodiment are omitted.

FIG. 8 is block diagram of a structure of the stepping motor driving apparatus in the second embodiment. FIG. 9 is a diagram of an example of the offset subtracting section in the second embodiment. A stepping motor has plural phases of windings, and elements provided for a winding are identical in each phase. Thus the following explanation is made for elements provided for one phase of winding.

The stepping motor driving apparatus as shown in FIG. 8 includes an offset subtracting section 55.

In the embodiment shown in FIG. 8, a signal showing the current target value is a current target value outputted from the reference signal generator 14, and a signal showing the detected current value is a result of subtracting the offset by the offset subtracting section 55 from the output of the supplied current measuring section 20. Detail of operation and effect of the offset subtracting section 55 is described later. The comparator 16 compares the input signal showing the detected current value with the input signal showing the current target value, and resets the flip-flop 17 when the signal showing the detected current value exceeds the signal showing the current target value, resulting in transition to the PWM OFF period.

Specific examples of offset subtraction by the offset subtracting section 55 are shown in FIGS. 9A to 9D.

In FIG. 9A, the offset subtracting section 55 includes a resistor 47 and a current source 48. The voltage determined by resistance of the resistor 47 and current value of the current source 48 is the offset to be subtracted. A diode may be used instead of the resistor 47.

In FIG. 9B, the offset subtracting section 55 includes a current source 48, a gate applied voltage 49, and a MOS transistor 50. The voltage determined by ON resistance of the MOS transistor 50 determined by the gate applied voltage 49 and current value of the current source 48 is the offset to be subtracted. The MOS transistor 50 may be either P channel MOS transistor or N channel MOS transistor.

In FIG. 9C, the offset subtracting section 55 includes source follower composed of a MOS transistor 51 and a current source 52, and the voltage between the gate and source is the offset to be subtracted. Instead of the source follower by the MOS transistor 51, emitter follower by a bipolar transistor may be used.

In FIG. 9D, the comparator 16 includes P channel MOS transistors 56a to 56c, N channel MOS transistors 57a to 57c, differential transistors 58a and 58b, and a current source 59. The offset subtracting section 55 includes differential transistors 58a and 58b composing the comparator 16. The offset occurring due to difference in size or the number of pieces of differential transistors 58a and 58b is the offset to be subtracted. Instead of generating the offset by the difference in size or number of pieces, the offset may be also generated by increasing or decreasing the one of currents flowing in differential transistors 58a and 58b to unbalance the currents flowing in differential transistors 58a and 58b.

Structure and operation of supplied current measuring section 20 are explained. The supplied current measuring section 20 detects the current flowing from the power source 1 to the winding 3 due to turn-on of transistors 6 to 9, outputting a detected current value. The supplied current measuring section 20 in this embodiment includes a detection resistor 21 as detecting means, an amplifier 25 as amplifying means, and a first offset adding section 40.

The amplifier 25 includes a sense amplifier 22 and gain setting resistors 23 and 24. The amplification factor of the amplifier 25, that is, the gain of output to input of the sense amplifier 22 is determined by the gain setting resistors 23 and 24.

In FIG. 8, the detection resistor 21 is used as detecting means. However as shown in FIG. 4, using the ON resistance of the MOS transistor 44 with the gate applied voltage 45 provided, the same operation as in the detection resistor 21 in FIG. 8 can be obtained. The current supplied to the winding 3 flows into the ground through the detection resistor 21, and the voltage determined by the resistance of the detection resistor 21 and the flowing current is generated across the detection resistor 21. The voltage across the detection resistor 21 is added the offset by the first offset adding section 40, and then is fed to the non-inverting input terminal of the sense amplifier 22 for composing the amplifier 25. The sense amplifier 22, that is, the amplifier 25 amplifies the input voltage by gain times, and sends the amplified voltage to the offset subtracting section 55.

In the embodiment shown in FIG. 8, same as in the first embodiment, during also PWM OFF period, the loop of the sense amplifier is maintained by the first offset adding section 40. Hence in transition from PWM OFF period to PWM ON period, transition from loop-out state to loop-maintained state of the sense amplifier does not take place.

As mentioned in the first embodiment, by determining the offset by the first offset adding section 40 so as to satisfy formulas (1) and (2), the detection delay can be eliminated, even when the current direction switch signal PHASE is changed and the current of the winding 3 is inverted. In particular, waveform distortion near zero cross can be prevented.

The offset subtracting section 55 is explained. In this embodiment, instead of the second offset adding section in the first embodiment, the offset subtracting section 55 is provided. In this embodiment, too, same as in the first embodiment, the offset added by the first offset adding section 40 causes the output value from the supplied current measuring section 20 to deviate from the value corresponding to the current actually flowing in the detection resistor 21. The output from the supplied current measuring section 20 is fed into the offset subtracting section 55. To prevent the current flowing in the winding 3 from deviating from the current target value, the value subtracting the offset by the offset subtracting section 55 is outputted to the comparator 16 as a detected current value.

As explained in the first embodiment, the output from the supplied current measuring section 20, that is, the output from the amplifier 25 is deviated from the value corresponding to the current value actually flowing in the detection resistor 21 indicated by the dotted line in FIG. 2, by the product of offset added by the first offset adding section 40 multiplied by the amplification factor of the amplifier 25.

By setting the offset by the offset subtracting section 55 equal to the product of offset added by the first offset adding section 40 multiplied by the amplification factor of the amplifier 25, the offset added by the first offset adding section 40 is canceled by the offset subtracted by the offset subtracting section 55 to be +/−0. As a result, judgment of current target value and current detected value by the comparator 16 is same as when no offset is applied, and thus deviation of the detected current due to the applied offset can be prevented.

As explained herein, according to the stepping motor driving apparatus of the second embodiment, the detection delay can be eliminated by adding the offset to the input of the sense amplifier 22. In particular, waveform distortion near the zero cross can be prevented. Also by subtracting the offset for canceling the offset added to the input of the sense amplifier 22, deviation of detected current due to the added offset can be prevented. In the embodiment, low noise and low vibration of stepping motor driving apparatus can be realized.

Third Embodiment

The stepping motor driving apparatus in a third embodiment of the invention is similar to the stepping motor driving apparatus in the first embodiment, except that the second offset adding section of the first embodiment is not provided.

Referring to FIG. 10, mainly the difference from the first embodiment is explained, omitting the same operations as in the first embodiment.

FIG. 10 is block diagram of a structure of the stepping motor driving apparatus in the third embodiment. A stepping motor has plural phases of windings, and elements provided for a winding are identical in each phase. Thus the following explanation is made for elements provided for one phase of winding.

The comparator 16 inputs a signal showing the detected current value and a signal showing the current target value. In the embodiment shown in FIG. 10, the signal showing the current target value is a current target value outputted from the reference signal generator 14, and the signal showing the detected current value is an output from the supplied current measuring section 20. The comparator 16 compares the input signals showing the detected current value with the input signal showing the current target value, and resets the flip-flop 17 when the signal showing the detected current value exceeds the signal showing the current target value, resulting in transition to PWM OFF period.

Structure and operation of the supplied current measuring section 20 are explained.

The supplied current measuring section 20 detects the current supplied from the power source 1 to the winding 3 by turn-on of the transistors 6 to 9, and outputs it as a detected current value. The supplied current measuring section 20 in this embodiment includes a detection resistor 21 as detecting means, an amplifier 25 as amplifying means, and a first offset adding section 40.

The amplifier 25 includes a sense amplifier 22, and a gain setting resistors 23 and 24. The amplification factor of the amplifier 25, that is, the gain of output to input of the sense amplifier 22 is determined by the gain setting resistors 23 and 24.

In FIG. 10, the detection resistor 21 is used as detecting means. However as shown in FIG. 4, using the ON resistance of the MOS transistor 44 with the gate applied voltage 45 provided, the same action as in the detection resistor 21 in FIG. 10 can be obtained. The current supplied to the winding 3 flows into the ground through the detection resistor 21, and the voltage determined by the resistance of the detection resistor 21 and the flowing current is generated across the detection resistor 21. The voltage across the detection resistor 21 is summed up with the offset by the first offset adding section 40, and then is fed to the non-inverting input terminal of the sense amplifier 22 for composing the amplifier 25. The sense amplifier 22, that is, the amplifier 25 amplifies the input voltage by gain times, and sends the produced voltage to the comparator 16 as a detected current value.

In the third embodiment shown in FIG. 10, same as in the first embodiment, in PWM OFF period, too, the loop of the sense amplifier is maintained by the first offset adding section 40. Thus in transition from PWM OFF period to PWM ON period, transition from loop-out state to loop-maintained state of the sense amplifier does not take place.

As mentioned in the first embodiment, the offset by the first offset adding section 40 which is an offset satisfying formulas (1) and (2) allows the detection delay to be eliminated even when the current direction switch signal PHASE is changed over with the current of the winding 3 inverted. In particular waveform distortion near zero cross can be prevented.

In this embodiment, too, same as in the first embodiment, because of the offset added by the first offset adding section 40, the output value from the supplied current measuring section 20 is deviated from the value corresponding to the current value actually flowing in the detection resistor 21. When the offset to be added by the first offset adding section 40 is "offset" and the resistance of the detection resistor 21 is "Rcs", the deviation of the detected current becomes "offset/Rcs". The current value actually flowing in the detection resistor 21 is deviated in a direction to be smaller than the current target value.

The embodiment does not have the second offset adding section in the first embodiment or the offset subtracting section in the second embodiment. It is not capable of canceling the deviation of the current flowing in the winding 3 from the current target value. When the deviation of the detected current is small and the deviation is within a permissible range, this embodiment is useful in terms of saving the number of components.

Regarding the current value actually flowing in the detection resistor, the deviation occurs in a direction so that the current is smaller than the current target value. This means, when the current target value is 0 A (Ampere), that the current flowing in the winding 3 becomes 0 A securely regardless of fluctuations. The offset added by the first offset adding section 40 can be utilized as an offset which compensates that the current flowing in the winding 3 is securely 0 A. When the current target value is 0 A, this embodiment is useful for compensating that the current flowing in the winding 3 is securely 0 A.

As explained herein, according to the stepping motor driving apparatus of the third embodiment, the detection delay can be eliminated by adding the offset to the input of the sense amplifier 22, and in particular waveform distortion near the zero cross can be prevented. The deviation of the detected current due to the offset added to the input of the sense amplifier 22 occurs, but to the contrary, the added offset compensates that the current flowing in the winding 3 is securely 0 A. Hence, in the embodiment, low noise and low vibration of the stepping motor driving apparatus can be realized.

Fourth Embodiment

The stepping motor driving apparatus in a fourth embodiment of the invention is similar to that in the first embodiment, except that the second offset adding section is not provided, and that a selector for selecting either one of the output of the detecting means or the output of the first offset adding section to output it into a later stage. Further a selector drive signal generator for judging that the PWM controller turns off the switching section and controlling the selector based on the judging result is provided in this embodiment.

Figure 11:
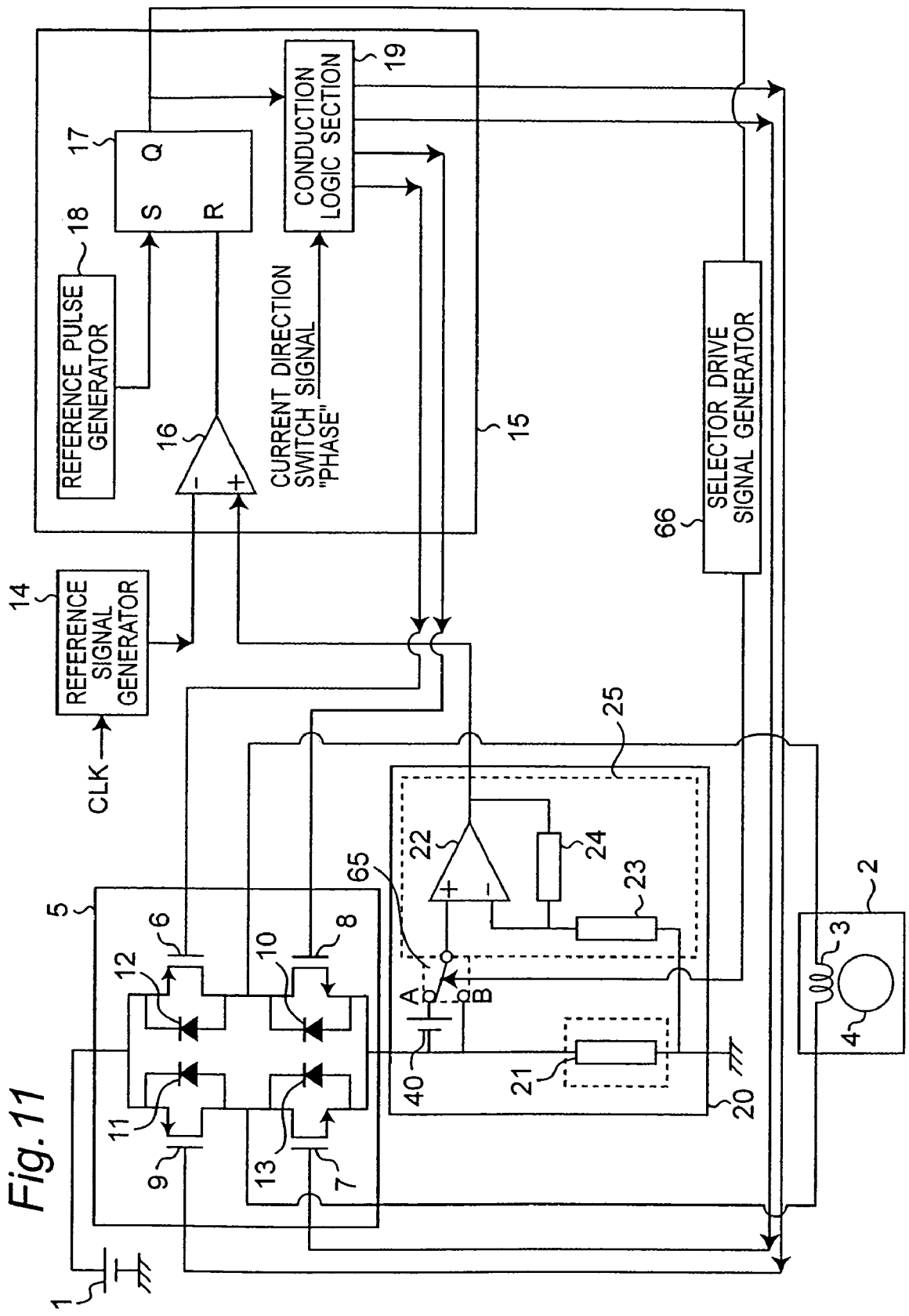
FIG. 11 is a block diagram of a structure of a stepping motor driving apparatus in a fourth embodiment of the invention.
Figure 12:
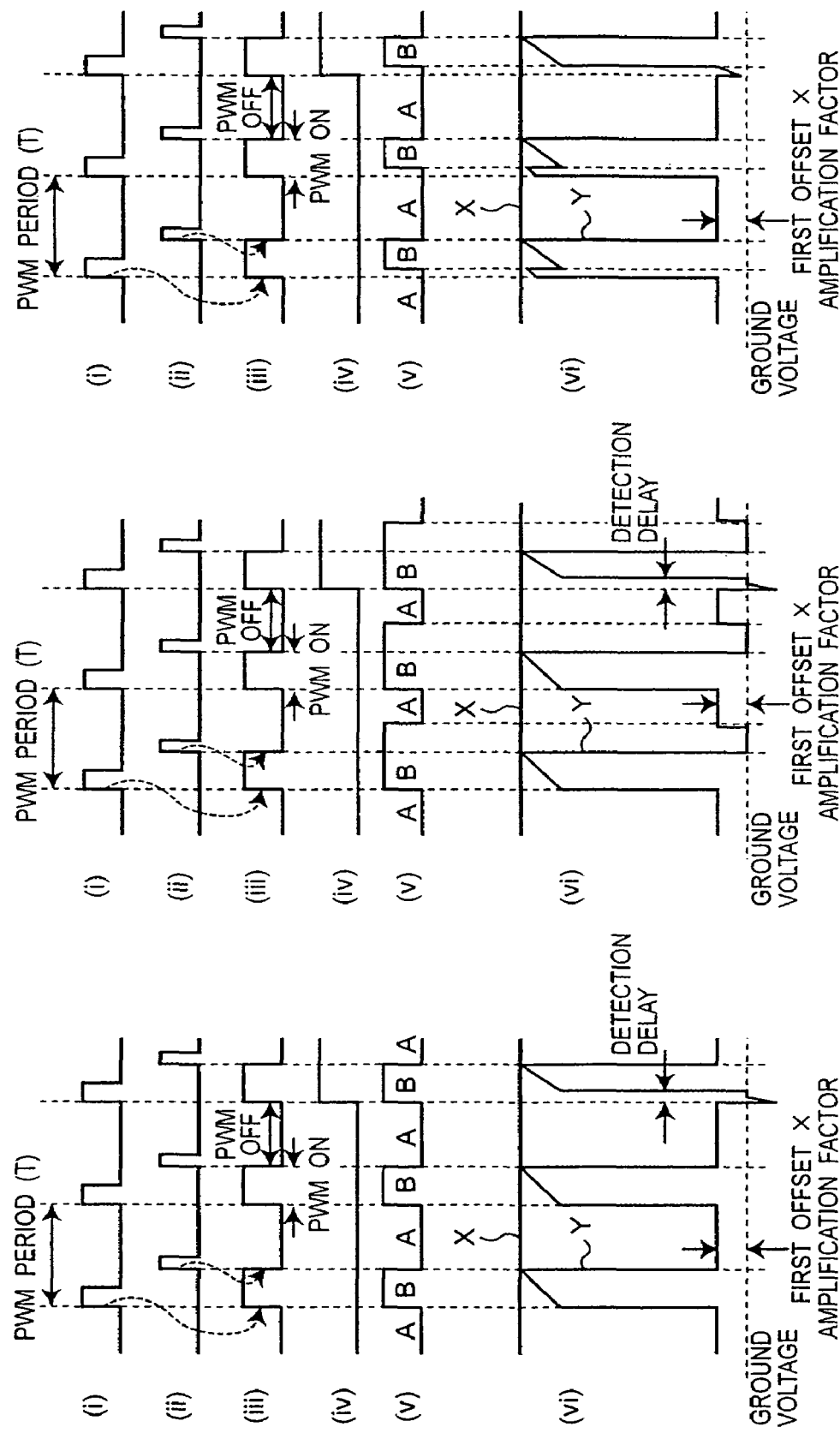
FIGS. 12A to 12C are waveform diagrams of a stepping motor driving apparatus in the fourth embodiment of the invention: (i) an output of a reference pulse generator, (ii) a comparator output, (iii) a flip flop output (PWM controller output), (iv) a current direction switch signal PHASE, (v) an output of a selector drive signal generator, (vi) an output ("X") of a reference signal generator (target current) and an output ("Y") of a supplied current measuring section (detected current).

Referring to FIG. 11 and FIG. 12, mainly the difference from the first embodiment is explained, omitting the same operations as in the first embodiment.

FIG. 11 is a block diagram of a structure of the stepping motor driving apparatus in the fourth embodiment. The stepping motor driving apparatus includes a selector 65 and a selector drive signal generator 66. A stepping motor has plural phases of windings, and elements provided for a winding are identical in each phase. Thus the following explanation is made for elements provided for one phase of winding.

FIGS. 12A to 12C are waveform diagrams of the stepping motor driving apparatus of the fourth embodiment.

In the fourth embodiment shown in FIG. 11, the comparator 16 inputs a signal showing the detected current value and a signal showing the current target value. The signal showing the current target value is a current target value outputted from the reference signal generator 14. The signal showing the detected current value is an output from the selector 65 which selects either one of the output of the detection resistor 21 and the output of the first offset adding section 40 to output it into a later stage. Specific operation and effects of the selector 65 are described later. The comparator 16 compares the input signals showing the detected current value with the signal showing the current target value, and resets the flip-flop 17 when the signal showing the detected current value exceeds the signal showing the current target value, resulting in transition to PWM OFF period.

Structure and operation of the supplied current measuring section 20 are explained. The supplied current measuring section 20 detects the current supplied from the power source 1 to the winding 3 due to turn-on of transistors 6 to 9, and outputs it as a detected current value. The supplied current measuring section 20 in this embodiment includes a detection resistor 21 as detecting means, an amplifier 25 as amplifying means, a first offset adding section 40, and a selector 65.

The amplifier 25 includes a sense amplifier 22, and gain setting resistors 23 and 24. The amplification factor of the amplifier 25, that is, the gain of output to input of the sense amplifier 22 is determined by the gain setting resistors 23 and 24.

In FIG. 11, the detection resistor 21 is used as detecting means. However as shown in FIG. 4, using the ON resistance of the MOS transistor 44 with a gate applied voltage 45 provided, the same action as in detection resistor 21 in FIG. 11 can be obtained.

The current supplied to the winding 3 flows into the ground through the detection resistor 21. The voltage determined by the resistance of the detection resistor 21 and the flowing current is generated across the detection resistor 21. The voltage across the detection resistor 21 is summed up with the offset by the first offset adding section 40, and then is fed to one of the terminals of the selector 65. The voltage across the detection resistor 21 is applied to the other terminal of the selector 65.

The selector 65 outputs optionally either one of the signal with offset and the signal without offset to the non-inverting input terminal of the sense amplifier 22 for composing the amplifier 25, depending on the command from the selector drive signal generator 66. The sense amplifier 22, that is, the amplifier 25 amplifies the input voltage by gain times, and sends the amplified voltage to the comparator 16 as a detected current value. In transition from PWM OFF period to PWM ON period, as far as the selector 65 is maintaining the output of the first offset adding section 40 to the sense amplifier 22, same as in the first embodiment, the loop of the sense amplifier 22 is maintained by the first offset adding section 40. Hence transition from loop-out state to loop-maintained state of the sense amplifier 22 does not take place. That is, the detection delay is eliminated, and waveform distortion can be prevented.

The control timing of selecting operation of the selector 65 by the selector drive signal generator 66 is explained by referring to FIGS. 12A to 12C.

FIG. 12A shows waveforms when the selector 65 passes the output of first offset adding section 40 in PWM OFF period and the output of the detection resistor 21 in the remaining period.

In FIG. 12A, a signal "A" is the output of the selector drive signal generator 66 when the selector 65 selects and passes the output of the first offset adding section 40. A signal "B" is the output of the selector drive signal generator 66 when the selector 65 selects and passes the output of the detection resistor 21. During PWM OFF period, the output of the selector drive signal generator 66 outputs a signal "A" to passes the output of the first offset adding section 40, and thus as explained in the first embodiment, the loop of the sense amplifier 22 is maintained. In PWM ON period, the output of the selector drive signal generator 66 outputs a signal "B" to pass the output of the detection resistor 21. During PWM ON period, a current flows in the detection resistor 21 and the loop of the sense amplifier 22 is maintained. Hence transition from loop-out state to loop-maintaining state of the sense amplifier 22 does not take place. That is, the detection delay is eliminated, and waveform distortion is prevented.

During PWM ON period, since the output of the detection resistor 21 is fed to the sense amplifier 22 not through the first offset adding section 40, deviation of the detected current due to the first offset adding section 40 does not occur. However, when the current direction switch signal PHASE is changed over and the current of the winding 3 is inverted, if a negative potential occurs in the detection resistor 21, the detection delay occurs. But when negative potential disappears, the detection delay also disappears.

FIG. 12B shows a waveform when the selector 65 passes the output of the first offset adding section 40 in a specified time before transition from PWM OFF period to PWM ON period, and passes the output of the detection resistor 21 in the remaining period.

Also in FIG. 12B, a signal "A" is the output of the selector drive signal generator 66 when the selector 65 selects and passes the output of the first offset adding section 40. A signal "B" is the output of the selector drive signal generator 66 when the selector 65 selects and passes the output of the detection resistor 21. In a specified time before transition from PWM OFF period to PWM ON period, the output of the selector drive signal generator 66 outputs A to pass the output of the first offset adding section 40. As explained in the first embodiment, the loop of the sense amplifier 22 is maintained.

In the successive PWM ON period, the selector drive signal generator 66 outputs a signal "B" to passes the output of the detection resistor 21. During PWM ON period, a current flows in the detection resistor 21, and the loop of the sense amplifier 22 is maintained, and hence transition from loop-out state to loop-maintained state of the sense amplifier 22 does not occur. That is, the detection delay is eliminated, and waveform distortion is prevented.

However, while the output of the selector drive signal generator 66 outputs a signal "B" during PWM OFF period, the loop of the sense amplifier 22 is out, and thus a specified period of transition from PWM OFF period to PWM ON period requires more time than that longer than the time required for changing from loop-out state to loop-maintained state of the sense amplifier 22. Otherwise, the transition from PWM OFF period to PWM ON period with the sense amplifier 22 out of loop may occur, and hence the detection delay may occur.

During PWM ON period, since the output of the detection resistor 21 is fed to the sense amplifier 22 not through the first offset adding section 40, deviation of the detected current due to the first offset adding section 40 does not occur. When the current direction switch signal PHASE is changed over and the current of the winding 3 is inverted, if a negative potential occurs in the detection resistor 21, the detection delay occurs. In this case, when the negative potential disappears, the detection delay also disappears.

FIG. 12C shows a waveform when the selector 65 passes the output of the first offset adding section 40 in PWM OFF period and in a specified time after the transition from PWM OFF period to PWM ON period, and passes the output of the detection resistor 21 in the remaining period.

In FIG. 12C, too, a signal "A" is the output of the selector drive signal generator 66 when the selector 65 selects and passes the output of the first offset adding section 40. A signal "B" is the output of the selector drive signal generator 66 when the selector 65 selects and passes the output of the detection resistor 21. In PWM OFF period and in a specified period after the transition from PWM OFF period to PWM ON period, the selector drive signal generator 66 outputs a signal "A" to pass the output of the first offset adding section 40. Thus as explained in the first embodiment, the loop of the sense amplifier 22 is maintained. After a specified time following the transition from PWM OFF period to PWM ON period, the selector drive signal generator 66 outputs a signal "B" to pass the output of the detection resistor 21. During PWM ON period, a current flows in the detection resistor 21 and the loop of the sense amplifier 22 is maintained. Hence the transition from loop-out state to loop-maintained state of the sense amplifier 22 does not take place. That is, the detection delay is eliminated, and waveform distortion is prevented.

However, in PWM ON period, since the output of the detection resistor 21 is applied to the sense amplifier not through the first offset adding section 40, and deviation of the detected current due to the first offset adding section 40 does not occur. In PWM OFF period and while the output of the selector drive signal generator 66 outputs a signal "A", deviation of the detection current by the first offset adding section 40 occurs. To the contrary, when the current direction switch signal PHASE is changed over and the current of the winding 3 is inverted, the selector drive signal generator 66 outputs a signal "A" longer than the time until the negative potential generated in the detection resistor 21 disappears. Hence, in spite of the negative potential occurring in the detection resistor 21, the loop of the sense amplifier 22 is maintained, the detection delay is eliminated, and waveform distortion is prevented.

In the example shown in FIG. 12C, the output of the first offset adding section 40 is selected by the selector 65 in a whole PWM OFF period. However, in a part of PWM OFF period, the output of the first offset adding section 40 may be selected. That is, the output of the first offset adding section 40 may be selected in a predetermined period before the transition from PWM OFF period to PWM ON period, and the output of the detection resistor 21 may be selected in the remaining period of PWM OFF period.

As explained herein, according to the stepping motor driving apparatus of the fourth embodiment, in the transition from PWM OFF period to PWM ON period, adding the offset to the input of sense amplifier 22 eliminates the detection delay in transition from PWM OFF period to PWM ON period. In particular, waveform distortion near the zero cross can be prevented. Without adding offset to the input of the sense amplifier 22 when detecting the current during PWM ON period, deviation of detected current due to the offset can be prevented. Hence, in the embodiment, low noise and low vibration of the stepping motor driving apparatus can be realized.

Fifth Embodiment

Figure 13:
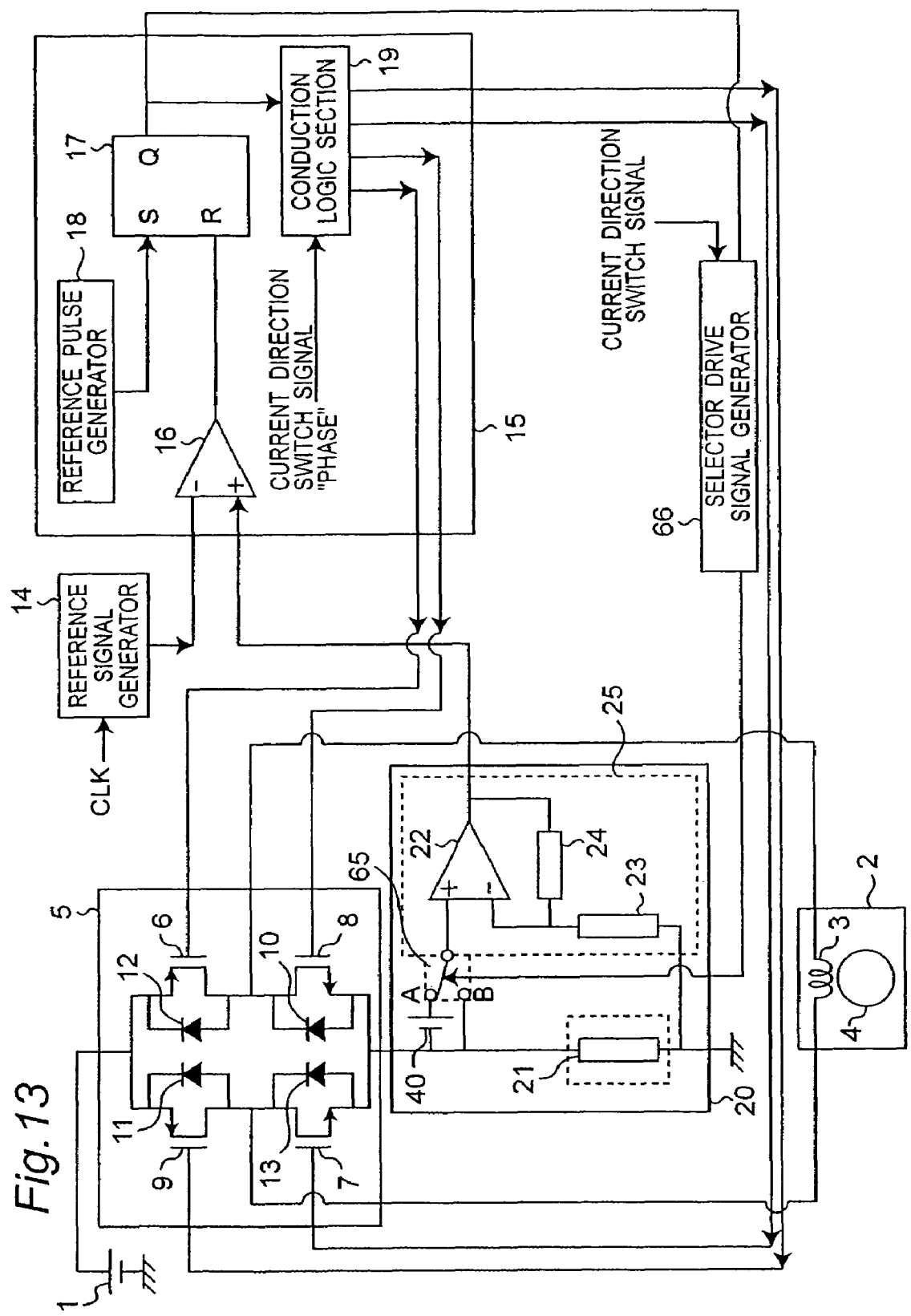
FIG. 13 is a block diagram of a structure of a stepping motor driving apparatus in a fifth embodiment of the invention.
Figure 14:
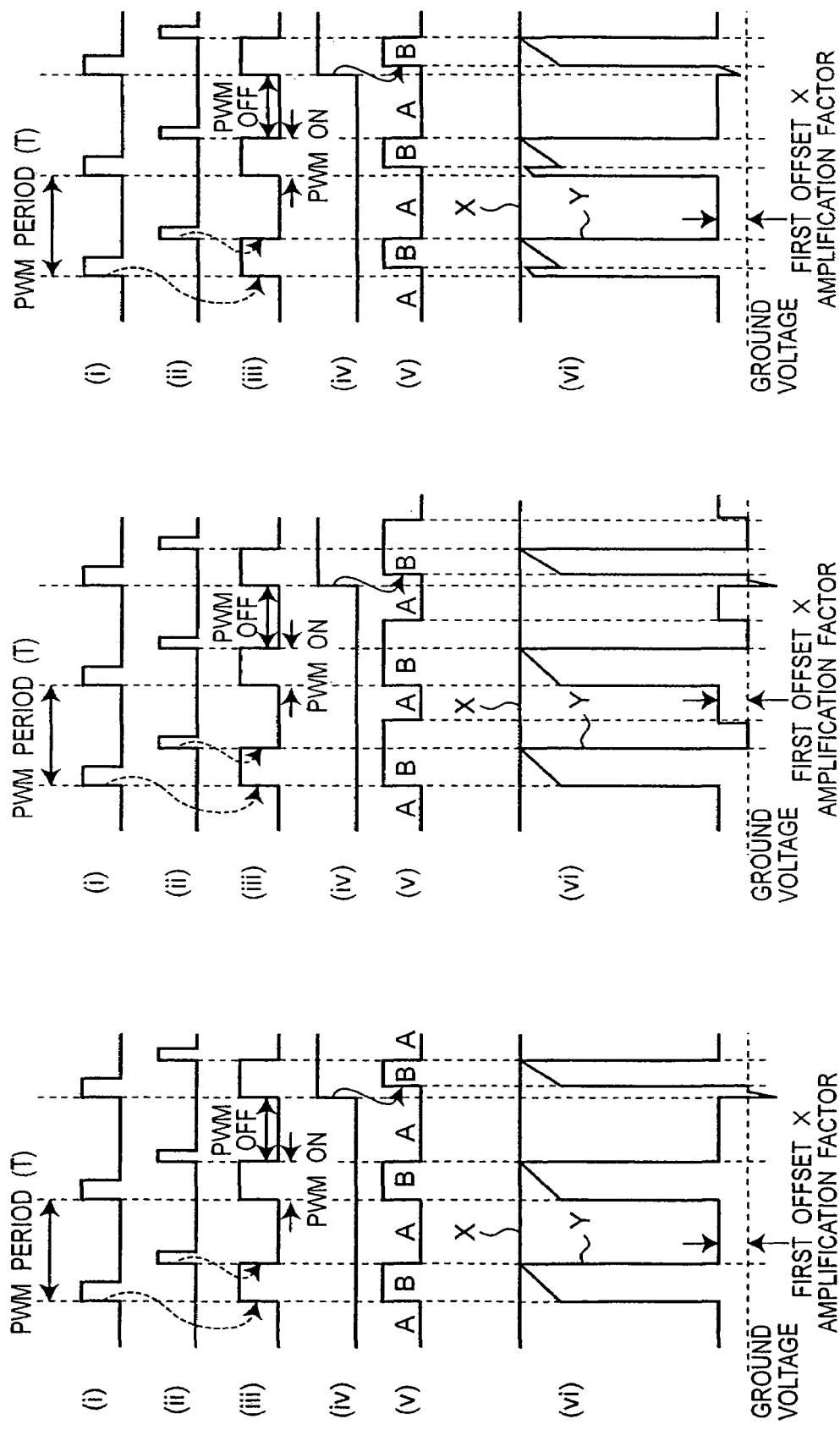
FIGS. 14A to 14C are waveform diagrams of the stepping motor driving apparatus in the fifth embodiment of the invention: (i) an output of a reference pulse generator, (ii) a comparator output, (iii) a flip flop output (PWM controller output), (iv) a current direction switch signal PHASE, (v) an output of a selector drive signal generator, (vi) an output ("X") of a reference signal generator (target current) and an output ("Y") of a supplied current measuring section (detected current).
Figure 15:
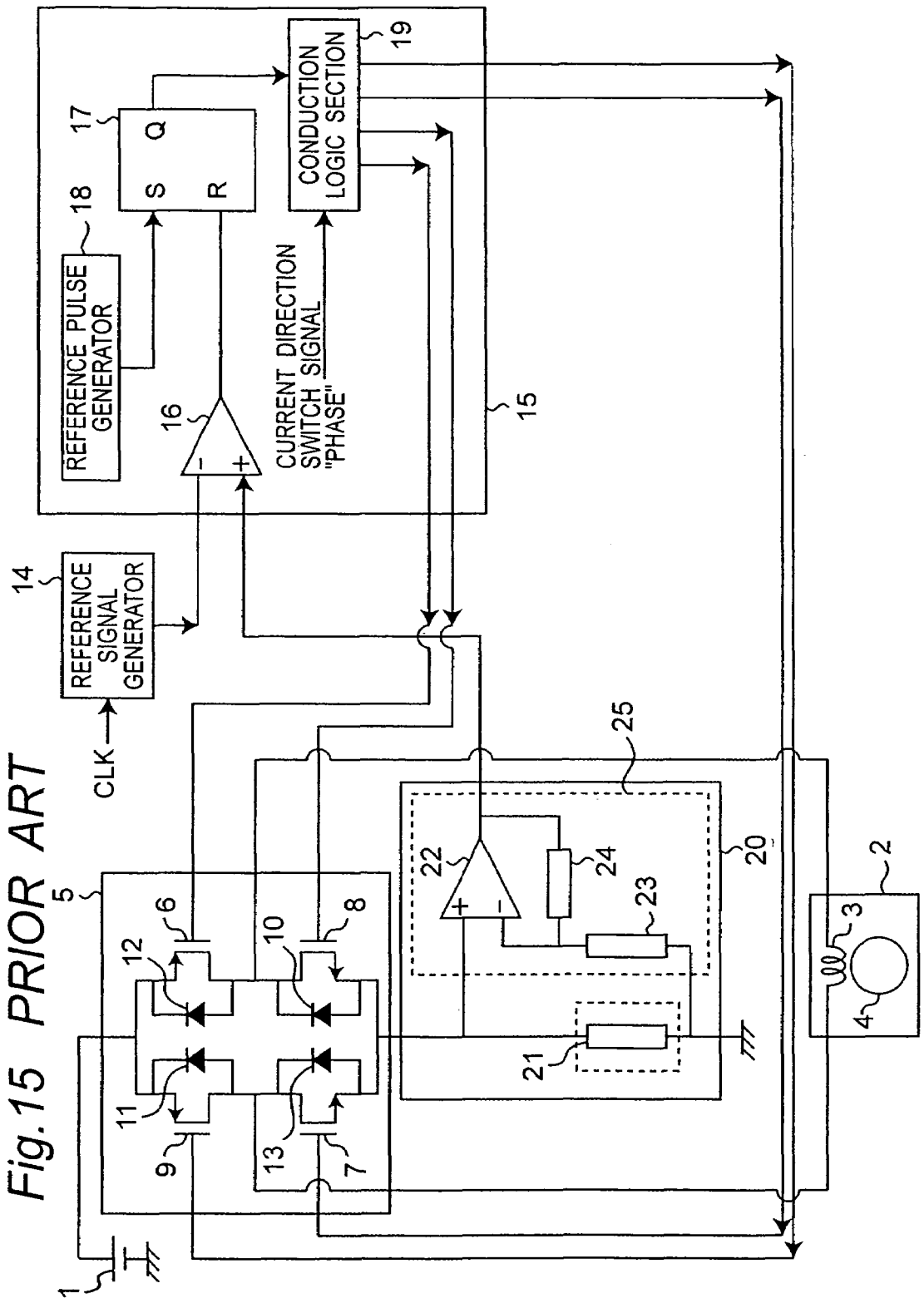
FIG. 15 is a structure of conventional stepping motor driving apparatus.

The stepping motor driving apparatus in a fifth embodiment of the invention is similar to the stepping motor driving apparatus in the fourth embodiment. The difference is that the selector drive signal generator in the fourth embodiment can turn off the switching section by the PWM controller and judge that changing over of the winding current is instructed. Referring to FIG. 13 and FIG. 14, mainly the difference from the fourth embodiment is explained, and the same operations as in the fourth embodiment is omitted.

FIG. 13 is block diagram of structure of the stepping motor driving apparatus in the fifth embodiment. A stepping motor has plural phases of windings, and elements provided for a winding are identical in each phase. Thus the following explanation is made for elements provided for one phase of winding. FIGS. 14A to 14C show waveform diagrams of the stepping motor driving apparatus of the fifth embodiment.

In the stepping motor driving apparatus of the fifth embodiment shown in FIG. 13, a current direction switch signal PHASE is fed to the selector drive signal generator 66, and the selector 65 is controlled based on the signal PHASE in addition to the control in the fourth embodiment.

The control timing of selecting operation of the selector 65 by the selector drive signal generator 66 is explained by referring to FIGS. 14A to 14C.

FIG. 14A shows a waveform when the selector 65 passes the output of the first offset adding section 40 in PWM OFF period and in a specific period after direction changeover of the winding current is instructed and passes the output of the detection resistor 21 in the remaining period.

In FIG. 14A, a signal "A" is the output of the output of the selector drive signal generator 66 when the selector 65 selects and passes the output of the first offset adding section 40. A signal "B" is the output of the selector drive signal generator 66 when the selector 65 selects and passes the output of the detection resistor 21. In PWM OFF period, and in a specific period after the direction changeover of winding current is instructed, the selector drive signal generator 66 outputs a signal "A" to pass the output of the first offset adding section 40. Hence, as explained in the first embodiment, the loop of the sense amplifier 22 is maintained.

In the successive PWM ON period, the selector drive signal generator 66 outputs a signal "B" to pass the output of the detection resistor 21. During PWM ON period, a current flows in the detection resistor 21, and the loop of the sense amplifier 22 is maintained, and hence the transition from loop-out state to loop-maintained state of the sense amplifier 22 does not take place. That is, the detection delay is eliminated, and waveform distortion is prevented.

During PWM ON period, since the output of the detection resistor 21 is fed to the sense amplifier 22 via not the first offset adding section 40, deviation of the detected current due to the first offset adding section 40 does not occur.

However, in this embodiment, also in a specific time after the current direction switch signal PHASE is changed over, the selector drive signal generator 66 outputs a signal "A" to pass the output of the first offset adding section 40. Hence if the current direction switch signal PHASE is changed over and the current of the winding 3 is inverted, the detection delay is eliminated, and waveform distortion can be prevented.

FIG. 14B shows a waveform when the selector 65 conducts the output of first offset adding section 40 in a specific period before transfer from PWM OFF period to PWM ON period and in a specific period after command for direction changeover of winding current, and the output of detection resistor 21 is conducting in the remaining period.

In FIG. 14B, a signal "A" is the output of the selector drive signal generator 66 when the selector 65 selects and passes the output of the first offset adding section 40, while a signal "B" is the output of the selector drive signal generator 66 when the selector 65 selects and passes the output of the detection resistor 21. In a specific period before the transition from PWM OFF period to PWM ON period and in a specific period after the direction changeover of the winding current is instructed, the selector drive signal generator 66 outputs a signal "A" to pass the output of the first offset adding section 40. As explained in the first embodiment, the loop of the sense amplifier 22 is maintained.

In the successive PWM ON period, the selector drive signal generator 66 outputs a signal "B" to pass the output of the detection resistor 21. During PWM ON period, a current flows in the detection resistor 21, and the loop of the sense amplifier 22 is maintained, and hence the transition from loop-out state to loop-maintained state of the sense amplifier 22 does not take place. That is, the detection delay is eliminated, and waveform distortion is prevented.

However, in the PWM OFF period with the selector drive signal generator 66 outputting a signal "B", the loop of the sense amplifier 22 is out. Thus, that is, a specific period before the transition from PWM OFF period to PWM ON period has to be longer than the time required for transition from loop-out state to loop-maintained state of the sense amplifier 22. Otherwise, PWM OFF period is changed to PWM ON period with the loop of the sense amplifier being out, and the detection delay occurs.

During PWM ON period, since the output of the detection resistor 21 is fed to the sense amplifier 22 via not the first offset adding section 40, deviation of the detected current due to the first offset adding section 40 does not occur.

In this embodiment, in a specific time after the current direction switch signal PHASE is changed over, the selector drive signal generator 66 outputs a signal "A" to pass the output of the first offset adding section 40. Hence if the current direction switch signal PHASE is changed over and the current of the winding 3 is inverted, the detection delay is eliminated, and waveform distortion can be prevented.

FIG. 14C shows a waveform when the selector 65 passes the output of the first offset adding section 40 in PWM OFF period, in a specific period after the transition from PWM OFF period to PWM ON period, and in a specific period after direction changeover of winding current is instructed, and it passes the output of the detection resistor 21 in the remaining period.

In also FIG. 14C, a signal "A" is the output of the selector drive signal generator 66 when the selector 65 selects and passes the output of the first offset adding section 40. A signal "B" is the output of the selector drive signal generator 66 when the selector 65 selects and passes the output of the detection resistor 21.

In PWM OFF period, in a specific period after transition from PWM OFF period to PWM ON period, and in a specific period after the direction changeover of the winding current is instructed, the selector drive signal generator 66 outputs a signal "A" to pass the output of the first offset adding section 40. Thus, as explained in the first embodiment, the loop of the sense amplifier 22 is maintained. After a specific period following the transition from PWM OFF period to PWM OFF period, the selector drive signal generator 66 outputs a signal "B" to pass the output of the detection resistor 21. During PWM ON period, a current flows in the detection resistor 21, and the loop of the sense amplifier 22 is maintained, and hence the transition from loop-out state to loop-maintained state of the sense amplifier 22 does not take place. That is, the detection delay is eliminated, and waveform distortion is prevented.

During PWM ON period, since the output of the detection resistor 21 is fed to the sense amplifier 22 via not the first offset adding section 40, deviation of the detected current due to the first offset adding section 40 does not occur, but in the PWM period with the selector drive signal generator 66 outputting a signal "A", the deviation of the detected current by the first offset adding section 40 occurs.

In this embodiment, also in a specific time after the current direction switch signal PHASE is changed over, the selector drive signal generator 66 outputs a signal "A" to pass the output of the first offset adding section 40. Hence if the current direction switch signal PHASE is changed over, and the current of the winding 3 is inverted, the detection delay is eliminated, and waveform distortion can be prevented.

In the example shown in FIG. 14C, the output of the first offset adding section 40 is selected by the selector 65 in a whole PWM OFF period. However, in a part of PWM OFF period, the output of the first offset adding section 40 may be selected. That is, the output of the first offset adding section 40 may be selected in a predetermined period before the transition from PWM OFF period to PWM ON period, and the output of the detection resistor 21 may be selected in the remaining period of PWM OFF period.

As explained herein, according to the stepping motor driving apparatus of the invention, in the transition from PWM OFF period to PWM ON period, adding of the offset to the input of the sense amplifier 22 can eliminate the detection delay in the transition from PWM OFF period to PWM ON period. In particular, waveform distortion near the zero cross can be prevented. Further, in a specific time after changeover of current direction switch signal PHASE, the offset is added to the input of the sense amplifier 22. Thus when the current direction switch signal PHASE is changed over and the current of the winding 3 is inverted, the detection delay is eliminated, and waveform distortion in particular near the zero cross can be prevented.

Still more, without adding the offset to the input of the sense amplifier 22 when detecting the current in PWM ON period, deviation of the detected current due to the offset can be prevented. Hence, in the embodiment, low noise and low vibration of the stepping motor driving apparatus can be realized.

INDUSTRIAL APPLICABILITY

The invention is applied to the stepping motor driving apparatus, and in particular is useful as an apparatus for reducing vibration and noise, since it can prevent occurrence of waveform distortion and deviation of detected current due to detection delay.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2005-200170, filed on Jul. 8, 2005, which is expressly incorporated herein by reference in its entirety.

What is claimed is:

1. A stepping motor driving apparatus comprising:
   a detector operable to detect a current supplied to a winding included in the stepping motor;
   a first offset adding section operable to add an offset to the output of the detector;
   an amplifier operable to amplify the output of the first offset adding section;
   a reference signal generator operable to generate a reference signal which indicates a current limit;
   a second offset adding section operable to add an offset to the output of the reference signal generator;
   a switching section operable to supply a power to the winding when the switching section is turned on, and cut off a power to the winding when the switching section is turned off; and
   a PWM controller operable to turn on the switching section every predetermined period, and turn off the switching section when the output of the amplifier exceeds the output of the second offset adding section,
   wherein the offset added by the second offset adding section is set to a value determined by multiplying the offset added by the first offset adding section by an amplification factor of the amplifier.

2. A stepping motor driving method comprising:
   detecting a current supplied to a winding included in a stepping motor;
   adding a first offset to the detected current;
   amplifying the detected current with the added offset;
   generating a reference signal which indicates a current limit;
   adding a second offset to the reference signal; and
   controlling turn-on and turn-off of a switching section, the switching section being operable to supply a power to the winding when the switching section is turned on, and cut off a power to the winding when the switching section is turned off,
   wherein the second offset is set to a value determined by multiplying the first offset by an amplification factor in the amplifying, and
   the controlling turns on the switching section every predetermined period, and turn off the switching section when the amplified current exceeds the reference signal with the added second offset.

* * * * *